(12) United States Patent
Holub et al.

(10) Patent No.: US 12,174,877 B1
(45) Date of Patent: Dec. 24, 2024

(54) SYSTEM AND METHOD FOR DATA GATHERING AND VISUALIZATION

(71) Applicant: Nested Knowledge, Inc., St. Paul, MN (US)

(72) Inventors: Karl J. Holub, New Brighton, MN (US); Stephen Mead, Avon, MN (US); Kevin M. Kallmes, St. Paul, MN (US); Natalie L. Reierson, Minneapolis, MN (US); Nicholas J. Mikoff, New Lenox, IL (US); John M. Pederson, Richmond, MN (US); Keith R. Kallmes, St. Paul, MN (US)

(73) Assignee: Nested Knowledge, Inc., Saint Paul, MN (US)

( * ) Notice: Subject to any disclaimer, the term of this patent is extended or adjusted under 35 U.S.C. 154(b) by 0 days.

(21) Appl. No.: 18/459,368

(22) Filed: Aug. 31, 2023

Related U.S. Application Data

(63) Continuation of application No. 17/105,972, filed on Nov. 27, 2020, now abandoned.

(60) Provisional application No. 62/940,629, filed on Nov. 26, 2019.

(51) Int. Cl.
*G06F 16/00* (2019.01)
*G06F 16/33* (2019.01)
*G06F 16/35* (2019.01)

(52) U.S. Cl.
CPC ........ *G06F 16/358* (2019.01); *G06F 16/3335* (2019.01); *G06F 16/3341* (2019.01)

(58) Field of Classification Search
CPC . G06F 16/358; G06F 16/3335; G06F 16/3341
See application file for complete search history.

(56) References Cited

U.S. PATENT DOCUMENTS

| 7,395,501 | B2 | 7/2008 | Graham |
| 7,469,249 | B2 | 12/2008 | Mihaila |
| 8,458,185 | B2 | 6/2013 | Nelson |

(Continued)

OTHER PUBLICATIONS

DISTILLERSR—"Literature Review Software Smarter Reviews: Trusted Evidence"—Downloaded Oct. 30, 2023—Available from Internet <URL: https://www.distillersr.com/products/distillersr-systematic-review-software>.

*Primary Examiner* — Syed H Hasan
(74) *Attorney, Agent, or Firm* — Gallium Law; Wesley Schwie; Justin Schwechter

(57) ABSTRACT

A system and method for measuring the quality of data reporting in a given medical study is presented. The instant innovation abstracts all relevant medical literature pertaining to a particular disease and categorizes the data and the study for quality and/or completeness. In an embodiment the instant innovation provides a system for study intake, permits user-determined search optimization, and provides for study data tagging. The innovation automates term inclusion and exclusion, automatically removing duplicates of previously collected study metadata, and then subjects the terms to a real-time sorting algorithm. Statistical analysis is performed upon included and excluded terms, and a representation of geometrical closeness from central tendency of any given data element is computed. The data elements and computed tendencies are reduced to a 2D visual representation and delivered to a user. The user may interact with the 2D visual representation using a device.

20 Claims, 27 Drawing Sheets

(56) References Cited

U.S. PATENT DOCUMENTS

| | | |
|---|---|---|
| 8,566,360 B2 | 10/2013 | Chen |
| 8,782,050 B2 | 7/2014 | Nelson |
| 8,843,479 B1 * | 9/2014 | Bharat ................ G06F 16/9535 |
| | | 707/731 |
| 8,935,291 B2 | 1/2015 | Chen |
| 10,229,117 B2 | 3/2019 | Cormack |
| 10,489,347 B2 | 11/2019 | Barton |
| 10,599,669 B2 | 3/2020 | Sexton |
| 10,706,113 B2 | 7/2020 | Lundin |
| 10,832,360 B2 | 11/2020 | Bufe |
| 10,866,992 B2 | 12/2020 | Pol |
| 11,037,062 B2 | 6/2021 | Nakata |
| 2002/0069086 A1 | 6/2002 | Fracek |
| 2002/0128860 A1 | 9/2002 | Leveque |
| 2010/0262454 A1 * | 10/2010 | Sommer ............... G06F 16/355 |
| | | 706/55 |
| 2012/0304247 A1 | 11/2012 | Badger |
| 2014/0330760 A1 * | 11/2014 | Meier ................... G06F 16/958 |
| | | 706/12 |
| 2017/0323064 A1 * | 11/2017 | Bates ..................... G16H 50/20 |
| 2019/0384895 A1 | 12/2019 | Jin |

\* cited by examiner

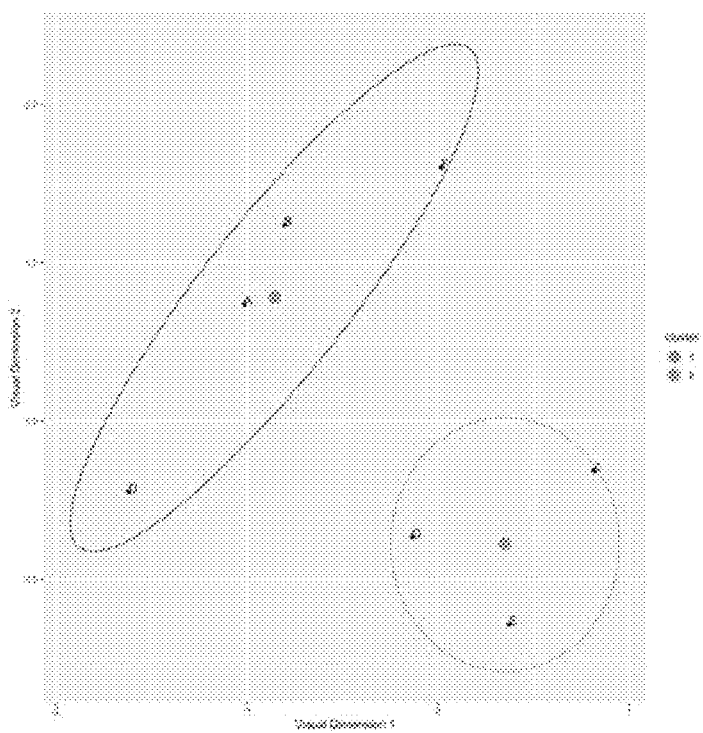
FIG. 7A         700
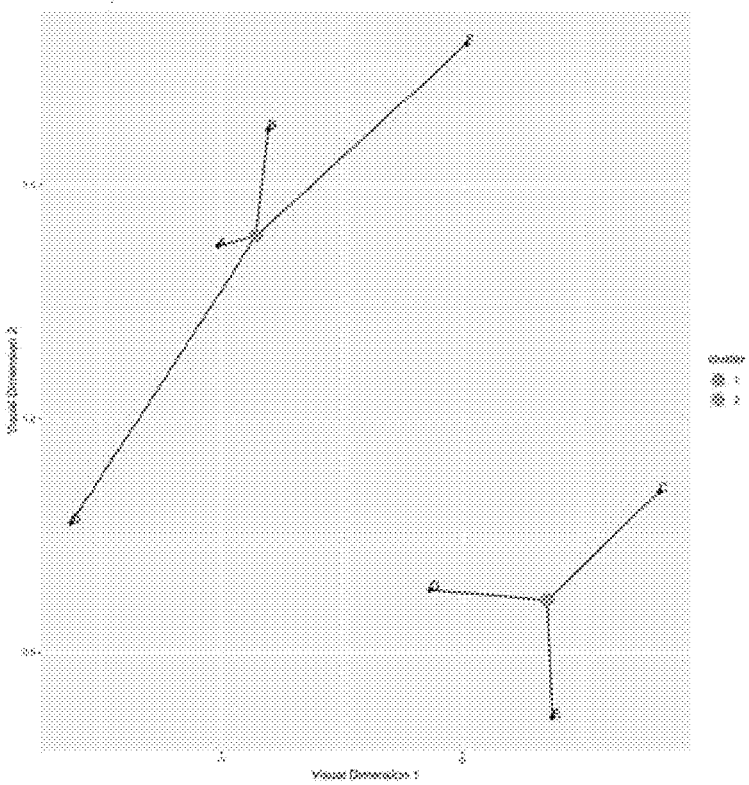
FIG. 7B         702

Search Builder

| # | Concept | Search String | Results ▲▼ | Inclusion Prediction ▲▼ | Action |
|---|---|---|---|---|---|
| 1 | PEEK, exp | 'Polyetheretherketone'/exp | 400 / 450 | 80.5 | Delete |
| 2 | PEEK, related name | 'peek' OR 'peek-it' OR 'peekit' OR 'peek it' OR 'peek it:' OR 'peekit2' OR 'peek it2' OR 'peek-it2' OR 'peekit3' OR 'peek it3' | 180 / 580 | 71.5 | Delete |
| 3 | PEEK, brands | 'Trelex' OR 'Serapem' OR 'Serapem' OR 'Dynamesh' OR 'proluc' OR 'Surgimesh' OR 'Evoluc' OR 'TiMesh' OR 'TiLene' | 7 / 110 | 66.2 | Delete |
| 4 | Hedge dbl; Publication Type | #NOT ('book/it OR 'chapter/it OR 'conference abstract/it OR 'conference paper/it OR 'conference review/it OR 'editorial/it OR 'erratum/it OR 'letter/it OR 'note/it | - 0 / 700 | N/A | Delete |
| · | [Add Text]  + Hedge | _____ | · | · | Run |

| Totals | 900 | 72.1 | Save to Final |
|---|---|---|---|

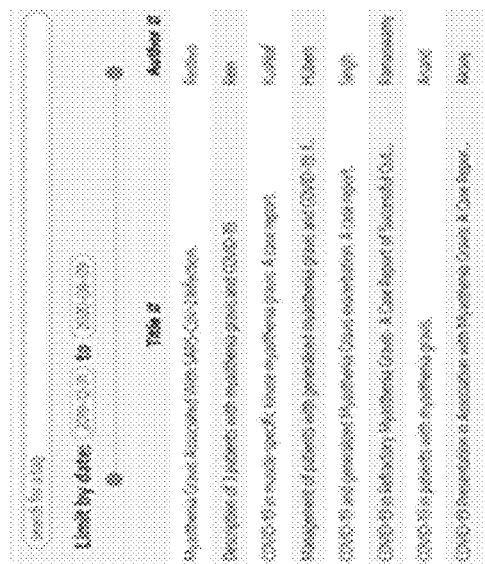
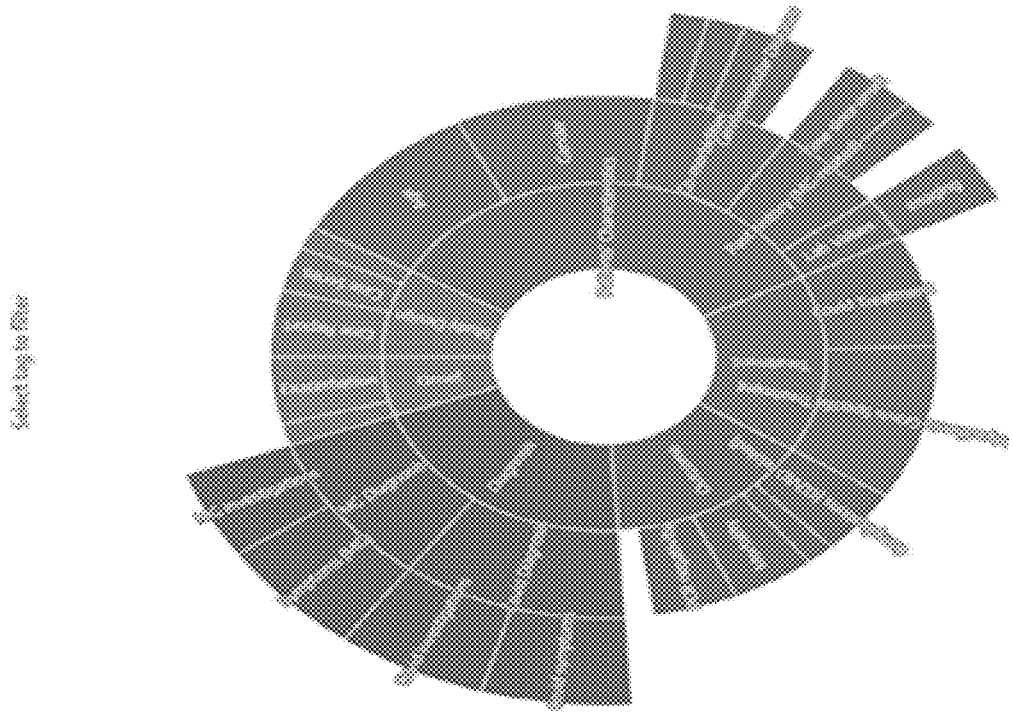
2402
FIG. 24
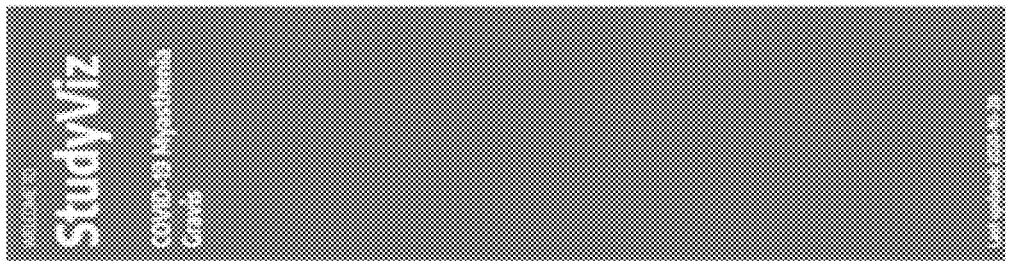

SYSTEM AND METHOD FOR DATA GATHERING AND VISUALIZATION

CLAIM OF PRIORITY

This Non-Provisional application claims under 35 U.S.C. § 120, the benefit of the Provisional Application 62/940,629, filed Nov. 26, 2019, Titled "System and Method for Data Gathering and Visualization", which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Within the medical field, data reflecting clinical study results are commonly presented via text-based literature reviews. Peer-reviewed literature typically describes clinical outcomes on a therapy-by-therapy or disease-by-disease basis for the benefit of physicians and other clinical research stakeholders. In recent years, the number of publications in clinical medicine has greatly increased, providing a plethora of valuable clinical data for practitioners, but up-to-date reviews cover only a small portion of these publications. The medical literature can be a rich repository of new techniques and pharmaceuticals, including efficacy and safety evidence. Textual meta-analyses and systematic reviews commonly appear in the English language, and represent the current paradigm of communicating combined, comprehensive clinical study results. However, this current paradigm depends on review authors constructing their data collection methods on a review-by-review basis, without centralized or harmonized data persistence, and without updatability. Lastly, this paradigm is heavily text-based, meaning visualization (especially interactive visualization) is largely lacking from existing review methods.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 7A is a seventh visual representation of a user experience consistent with certain embodiments of the present invention.

FIG. 7B is an eighth visual representation of a user experience consistent with certain embodiments of the present invention.

FIG. 11A is a fifteenth visual representation of a user experience consistent with certain embodiments of the present invention.

FIG. 11B is a sixteenth visual representation of a user experience consistent with certain embodiments of the present invention.

FIG. 16 is a twenty-first visual representation of a user experience consistent with certain embodiments of the present invention.

FIG. 24 is a twenty-ninth visual representation of a user experience consistent with certain embodiments of the present invention.

DETAILED DESCRIPTION

Figure 1:
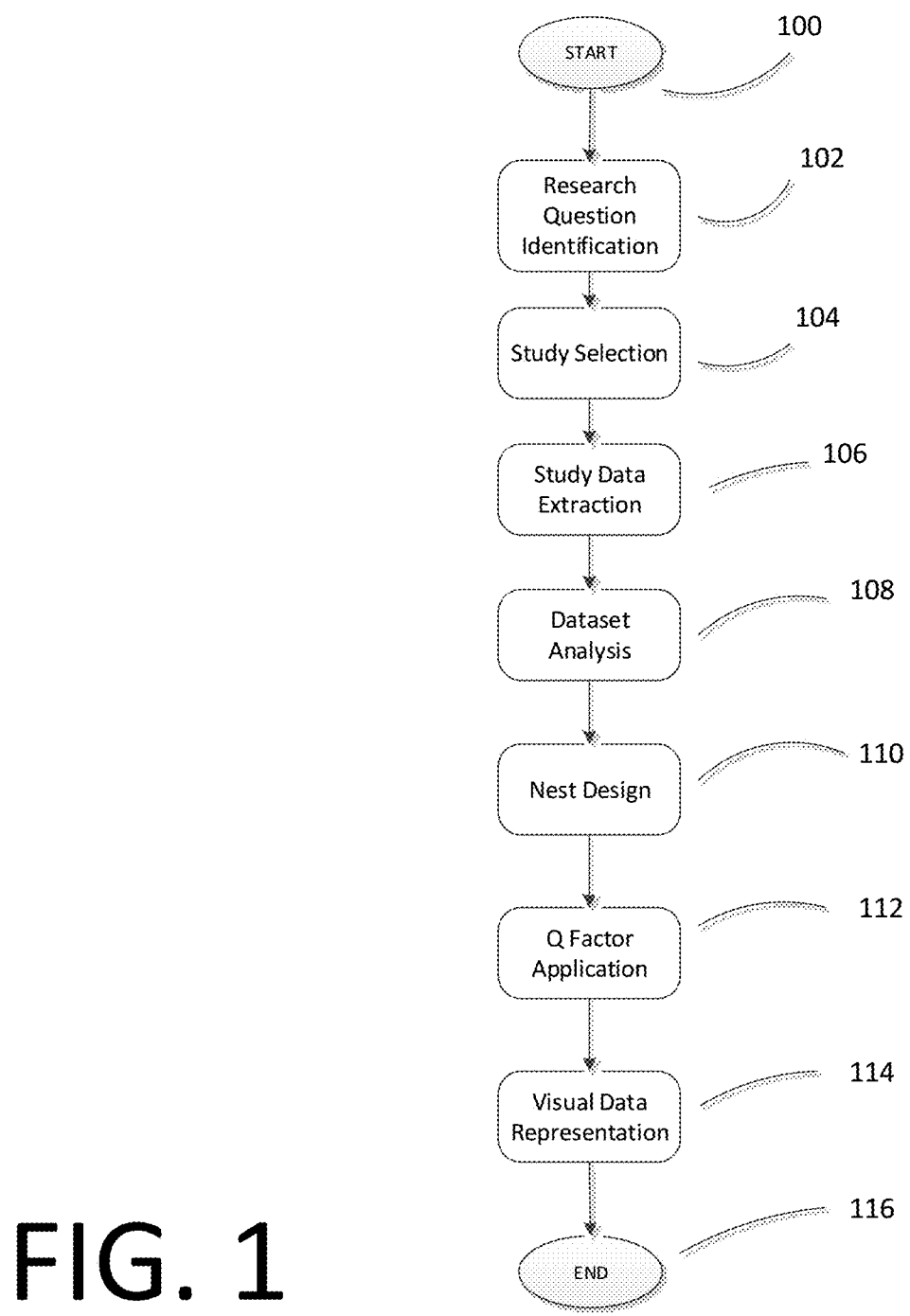
FIG. 1 is a process flow diagram consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

As used herein, "Nest" refers to a visualization platform employing a range of conventional and novel visualizations of meta-analytical data in order to most effectively communicate the observed outcomes of therapies on different patient populations in a given medical subfield.

As used herein, "Nest Hub" refers to a network diagram of all the therapies reported by studies included in the nest.

As used herein, "Navigation Pane" is a small, interactive set of interconnected visuals that are miniature versions of each of several pages in a nest.

As used herein, "Causation Plots" are x-y graphs that enable users to compare any characteristic, treatment choice, or outcome against any other characteristic, treatment choice, or outcome.

As used herein, "Harmonization Factor" or "Q Factor" is a value used to assess how well a study reports the data that would be necessary to complete a meta-analysis based on its findings.

As used herein, "Clustering" refers to an automated method for identifying patterns and groupings in data.

As used herein, "Q search" represents a data search in which all data elements gathered through our processes are treated as selectable search terms in a limited search of the articles included on the Applicants' site.

As used herein, "Nested Knowledge" represents Applicants' vehicle for commercialization of the instant innovation, and in some instances is used as a shorthand reference for the instant innovation itself.

As used herein, "NLM" refers to the National Library of Medicine of the National Institute of Health, part of the U.S. Department of Health and Human Services.

As used herein, "MeSH filters" refers to NLM assigned tags denoting the type and contents of a study.

As used herein, "MedLine" refers to the index provided to the NLM that underlies the https://pubmed.ncbi.nlm.nih.gov/database.

As used herein, "PRISMA" refers to Prevention and Recovery Information System for Monitoring and Analysis, a method to manage human error.

As used herein, "EQUATOR" refers to a professional medical writing guidelines and resource organization affiliated with the University of Oxford.

As used herein, "RIS" refers to the standardized Research Information Systems (RIS) format of citation metadata.

As used herein, "PMID" refers to the PubMed Identification number applied by Medline and the NLM as a unique study identifier to studies indexed on Medline and presented through the https://pubmed.ncbi.nlm.nih.gov/database.

As used herein, "nBIB" refers to the standardized MedLine nBIB format of citation metadata.

As used herein, "Study Viz" refers to the sunburst diagram and filterable table that present tags applied to studies within a Nest.

As used herein, "geometric closeness" refers to a subjective comparison based upon human perception of relatedness of studies in an arbitrary geometric space.

Within the medical field, data presented via text-based meta-analyses/systematic literature reviews are often outdated, narrowly focused, and non-comprehensive, leading to poor communication of vital, evolving clinical methods and outcomes between physicians and other diverse stakeholders in clinical research. Therefore, a need exists to provide an online, consistently updated data visualization of a comprehensive meta-analysis of clinical studies within a given subfield of medicine. The instant innovation's Nested Knowledge enables users to systematically collect data in a harmonized format, hierarchically organize the concepts within datasets, and automatically generate visuals that present comprehensive research on therapeutic outcomes in an interactive and nested visual interface. The instant innovation overcomes the limitations of traditional meta-analyses through implementation of a software-based "full-life-cycle" meta-analytical approach in concert with a visualization platform (henceforth referred to as a "Nest") that can be customized to the needs of a medical field based on user-influenced design. The instant innovation thus overcomes major barriers to the transparency, completeness, and ease of communication of medical research data and renders medical studies more available and more understandable to a wider audience.

In an embodiment, applicants have converted best practices in systematic review of medical publications and Network Meta-Analysis (NMA) into a semi-automated research process that integrates technological tools with expert review that can be completed by any user. Furthermore, by placing all review and NMA steps into a single platform (i.e. a "full-lifecycle" approach), Applicants have created a process by which not only the review data but also each step taken by a user in the search and collection methodology is recorded, providing a full record of research strategy as well as updatable datasets across medical fields. These datasets are also harmonized, meaning that they can be compared on a 1-to-1 basis since consistent gathering systems prevent differences in collection strategy from arising.

Applicant's single platform includes, in an embodiment, one or more software algorithms that are integrated into the semi-automated research process. When using Applicants' software, a user, based on the user's expertise or expert guidance, first determines research questions of interest within a medical subfield. The user then creates a set of keyword searches representative of those research questions. Keyword-based searches in Medline and other databases are completed, using an automated filter and then are validated through the use of inter-observer variability quality control methods to verify the inclusion of each study. Then, the data from the studies are gathered and compared using meta-analytical statistics, and the major patient characteristics, treatments, and outcomes for final reporting are identified. These are then displayed on the visuals described below.

In a software-integrated embodiment of the instant innovation, applicants' software enables users to auto-generate and display a range of conventional and novel visualizations of meta-analytical data in order to most effectively communicate the observed outcomes of therapies on different patient populations in a given medical subfield. Applicants' software also applies quality metrics such as Q Factor analysis, as well as categorizing of underlying research by conceptual relatedness through centroid clustering, described herein.

The "Nests" of the instant innovation are organized through a personalized access page wherein users create, manage security/user settings, and access nests. Users can select a "Nest" based on the subfield and specific disease state or topic being presented. Within this nest, users can search, screen, tag, and extract data related to this specific disease state or topic. Based on the user's work, an interactive NMA visualization is built showing the comparison between different therapies, and users also have access throughout the process to an interactive table showing each study's data. Furthermore, users can build a customized hierarchy of content tags that are applied to studies in order to build interactive visualizations of qualitative content tagged across a given set of studies.

A range of visuals assist in judging the completeness and accuracy of the construction of a nest, and when the Nest is complete, enable interactive examination of each characteristic, therapy, and outcome gathered from studies in the meta-analysis. These include access directly a summary table with odds ratios compared to a baseline therapy, forest plots of individual studies, correlation matrices of characteristics vs. outcomes, and causation plots comparing any given data element to another in an X-Y plot. They also include a repository of the data in question organized by study, with customizable presentation and ranking of the studies based on user selections. Throughout the visual outputs of a completed nest, a navigation pane enables easy access to any given visual, and a selectable legend enables users to select the levels of evidence they want to include, the years of study included, and a range of similar selectable inclusions/exclusions, alongside explanations of the visual in question.

In an embodiment, applicants have developed a range of study metrics that are only possible due to the richness of data gathered and contextual information configured by the user. These generally relate to the reporting quality of the data, and the novel data available to Applicants has enabled us to give far deeper insight into the data element reporting of underlying studies. For example, Q Factor, which is a study-by-study metric of data harmonization and data element reporting based on comparison to studies of similar research questions, can be presented through a study-ranking visualization.

The process of a review and NMA within the Nested Knowledge software embodiment covers the Search for studies that may be included in the analysis (with Optimization and Search Building features), Screening studies to adjudicate whether they should be included or excluded, Tagging studies with user-configured hierarchical content tags that are applied across included studies with associated text extractions, Extraction of Data Elements that represent the quantitative variables presented within a study, automated Statistical Analysis using NMA methods, and Visualization of the tags and analysis outputs. A completely novel feature of the Nested Knowledge process is that the Search is auto-updated and each subsequent step can be repeated whenever new search results are returned.

The process of a review begins through user configuration, which includes entering a medical subfield of interest and a disease state. Then, once a subfield is selected, suggested search terms are auto-generated by the software. The following description of methods covers the construction of a single nest; different nests are accessible at the construction stage based on adding collaborators through the configuration page; once completed, the visuals generated for a Nest can be shared or published through a durable URL.

Clinical study searches are completed on Medline or similar medical research databases, most of which use Boolean search algorithms. Results are automatically de-duplicated between databases, and inclusion prediction and coverage analysis provide quantitative feedback concerning the completeness of the search strategy and the quality of search term selection. Applicants aim to include 100% of relevant studies, but limitation of needless review of unrelated keywords is a secondary aim. In order to maximize the sensitivity of a search, the following Search Optimization processes are used to guide search term selection in an embodiment of the present innovation:

Search Optimization:
    Candidate search terms are entered that match the disease state, treatments, and outcomes of interest.
    N-Gram visualization: Based on these terms, MeSH keywords (NLM assigned tags describing the high level contents of a study) and common abstract terms. Terms are tokenized into n-grams and each n-gram groupings are immediately extracted via API from MedLine. The n-grams are down-sampled in advance of tokenizing to balance representation across search terms and reduce the complexity of results presented to the user.
    Topic Modeling: Using a linguistic clustering algorithm, a rectangular plot of the topics that appear most commonly across studies returned from searches is automatically generated. The clustering algorithm is parameterized by user configurations that enable adjustment of model complexity, number of topics presented, and removal of irrelevant topics.

Venn Clustering: Through a two-dimensional model of multivariate relationships, the overlap between candidate search terms is visually presented to the user to ensure full coverage of concepts of interest. We use 'least squares' optimization on the set of second- and third-degree intersections between search terms to fit a two-dimensional Venn diagram representing the overlap in candidate search term results.

Search Optimization therefore informs the user of the most common keywords, the uniting concepts, and the coverage of the terms in question. At this point, the user moves forward to edit and expand the search terms through Search Building.

Search Building:

The disease state, treatments, and outcomes entered by the user are automatically combined with Boolean operators. The search terms are run via API to indices of interest, and study abstracts and metadata for all results are pulled from each index to support Search Building/Optimization and Screening activities.

All search strings are automatically 'exploded': By comparing against the Unified Medical Language System and MeSH term hierarchy, spelling variations or synonyms are automatically searched alongside the user-selected terms.

The user is then prompted to 'pre-screen' 50 to 100 studies, marking them as 'included,' 'excluded,' or 'potentially relevant' (if final adjudication should be delayed). The user can either do this study-by-study, or by 'bulk' relevancy determination in the Topic Modeling page.

The user can then add Standard Hedges, which are pre-configured search strings that enable the user to limit the search in consistent ways. Standard Hedges are configured by entering the hedge string into the Search Builder and then identifying it as a Standard Hedge, which adds it to that specific user' Standard Hedge library for application on any subsequent Nest.

Inclusion Prediction: Based on these pre-screening activities, a machine-learning algorithm identifies traits of the abstract text and metadata of included vs. relevant vs. excluded studies. From this point on, as each study is screened, the machine-learning prediction is automatically updated; the more studies that are added, the more certain the algorithm's results.

ROC-AUC: A receiver operating characteristic (ROC) calculation is automatically undertaken to determine the accuracy of the algorithm, generating an area under the curve (AUC). This ROC-AUC is generated by treating 80% of screened studies as a training dataset and 20% as a test dataset, and then repeating the method 4 more times (with a new 'test' dataset each time) until all studies have been used as 'test' studies. The ROC-AUC represents the sensitivity and specificity of the machine learning algorithm in identifying 'includable' studies. The output of the ROC-AUC to the user is thus presented as the accuracy of the Inclusion Prediction model, on an updatable basis, as any new screening activities are completed.

Search string selection: The user can then type in any candidate search string into the Search Builder and see:
The number of total results.
The number of unique results.
The predicted rate at which these unique results will be included in the nest, based on the Inclusion Prediction Model.
A button that enables the user to 'add' the candidate search string, which automatically adds this search string to the final search that will be run by the user.

Search Finalization: Once a user has 'added' all candidate search strings of interest, the search is finalized and run on all indices.

Update Scheduling: Within the builder, the user configures an update schedule for the search by selecting Day, Week, Month, or Never. This sets the search to run via API on each index at the intervals identified by the user.

Whenever a search string is run (either for candidate or final searches), the following steps are completed in order to take in search results from the APIs:

Runs each search term in Medline or a similar index/database and selects all studies that result from that search.

Counts the number of studies found and the number of duplicates, and records both.

Records this information, along with the date and the name of the person running the search.

From each study, the following metadata are saved:
Publication Details
    Date of Publication
    Journal+issue
    PMID
Title
Authors
    First, last name
    Affiliation
        Institution name
        Physical location of Author Institution
Article keywords (MeSH if on MedLine)
Article Abstract.
DOI
URL of study This feeds all analytics enables our researchers to complete studies on the geography, institutions, journals, and other factors related to the metadata of the studies included in our analysis, as well as organize the studies in our internal database based on Author, Title, PMID, etc.

In an embodiment, the algorithm then completes automated exclusion of studies unlikely to be related to the research question of interest. In a non-limiting example, such studies may include, based on user configuration:

Automatic exclusion of studies with any given MeSH tag (e.g. automatically excluding all studies tagged with the 'H1n1 virus' tag to differentiate from any other influenza strain).

Studies that have any of the following terms in their title:
    Meta-analysis (though Meta-analysis titles and links are still listed in the Repository as described herein).
    Systematic Review
    Case Report
    Interim Report
    Editorial
    Letter
    In vitro
    In vivo Studies outside of any date range specified in our inclusion/exclusion criteria are excluded.

In a further novel automated inclusion/exclusion method, after all other inclusion/exclusion activities are completed as described herein, each search term is subjected to a real-time sorting algorithm: As the researcher reviews studies for inclusion, a logistic model is constructed on the bag of MeSH terms & keywords associated with each study. The presence of MeSH terms & keywords with exceptionally high probability of exclusion or inclusion allow the model to suggest inclusion or exclusion without any human intervention. The auto-suggestions are displayed to the reviewer (including the most culpable keyword) to expedite their review; in cases of near certainty, the model automatically includes or excludes a study, without any human review. As more studies are manually reviewed throughout the process, the model is updated and confidence in suggestions increases, providing data that both validate the model through comparison to human inclusion/exclusion and give information toward future inclusions/exclusions.

In an embodiment, for search results from any index not connected via API to our site, users are enabled to upload search results in bulk to the site via "RIS/nBIB import". In this optimal step, a user downloads a RIS or nBIB file from an index that contains the study metadata from a search. The user identifies the search strings and date of search, as well as the index searched, and uploads the RIS or nBIB file. Using all relevant metadata (e.g. Title, Authors, DOI, URL), the studies in the file are de-duplicated against any studies that were previously searched via API. De-duplication uses the following methods:

1. We perform de-deduplication within the imported set of references. To deduplicate, we use exact matching PMID, DOI, and link, and fuzzy matching on title (using Jaro-Winkler string similarity). All matches are robust to missing data and pass on doing matching if a reference attribute is missing.
2. We then apply denials (e.g. if titles are similar, but the DOIs do not match) to the set of duplicates to generate the set of fully unique studies.
3. We then match the unique incoming studies to existing studies in the database using the same methods as (1) & (2), except doing the comparison across sets of references, instead of within the single set of imported references.
4. For unique, unmatched references we create new database entries. For matched references, we leave their existing entries (e.g. inclusion status, tags, comments, etc.) in place in the database.
5. Then, any near-matches for which an action was not definitively decided are sent to "quarantine" for human review and manual de-duplication of any records that are not definitively decided by this automated method.

RIS or nBIB study results are treated the same as any other results from this point forward, except that updating features require the user to manually re-upload the updated search.

Screening:

Then, Screening is undertaken by the user. The Sequential Screening portal on the site presents the studies to a user in the order of 'most likely to be included' as calculated by the Inclusion Prediction model. We use the following queuing method to ensure no cross-over between users:

An arbitrary number of users are allowed to screen simultaneously.

We maintain a queue of studies that are next to be screened.

Studies are ordered by:
    predicted inclusion rate,
    whether the user has skipped them in the past (more recent skips are pushed to the back of the queue), then
    order by which studies were imported When a given user is viewing a study, that specific user's instance has a mutually exclusive lock on the study, which means no other user may view that study at the same time.

When this user skips, includes, or excludes the study, the lock is removed.

When a new study is queued for a user, it is selected from the queue using the ordering method described above.

If the study has been included/excluded more than the requisite number of times (once for single screening or twice for Dual Screening), a different user holds the lock on the study, or that user has already included/excluded it, the user is presented with the next study in the queue, until none of these 3 conditions are met.

In an embodiment, before screening studies, the user configures all exclusion reasons that will be applied to studies; any reason may be configured by typing it into the Exclusion Reasons drop-down and "adding" it as a reason. A single user then reads the title, abstract, and if necessary, full text of each article, and records in the proprietary site whether the study in question should be included or excluded, and if it is excluded, the reason for exclusion, based on prompts and drop-down menus. If the full text is reviewed, that is noted in a check-box, and then if the study is included, the user is prompted to upload a full text PDF of the study in question to inform the Tagging and Automated Tabular Extraction steps. If a study is excluded, the reason for exclusion is saved for PRISMA export.

In an embodiment referred to as "Dual Screening", once automated exclusion is completed, the process described under Screening is completed in parallel by two or more separate users. All studies are screened by independent users, with a balancing algorithm ensuring that each study is screened exactly twice, though more than two users can participate in Dual Screening. If more than two users screen, the queuing algorithm follows the methods described above, but with two iterations of screening required by two independent users on each study.

In an embodiment, once both researchers in Dual Screening have identified whether each study reviewed should be included and (if excluded) the reason for the decision, the proprietary software compares each response and "accepts" as correct each decision in which the researchers agreed completely (on whether to include and, if excluded, the reason). The system then sends the studies on which the reviewers disagreed to a third-party adjudicator, who may review the studies and determine the final inclusion/exclusion for each study and reasons for these studies. This method is based on diagnostic accuracy methods (specifically, the concept of inter-observer agreement), but to our knowledge, it is the first systematic application of such methods through a proprietary software to study search results.

In an embodiment, the proprietary software logs all studies included and excluded at each stage and generates both a table representing the personnel and search terms involved in the search as well as a PRISMA diagram representing the total number of studies included and excluded, as well as the reasons for exclusion. This is based on the guidance issued by the EQUATOR Network on PRISMA diagram construction.

After the above process is completed, the proprietary software generates a full report of the inclusion and exclusion process, and then prompts the user to move on to the Tagging step.

Tagging:

After studies are screened, the user is prompted to configure hierarchical tags. In the tag configuration page, the user adds any tags that represent the concepts the user plans to identify within the set of studies. To add and organize tags, the user:

Selects "Create Tag", and fills in the tag name and any aliases (acronyms or synonyms).

If the tag is at the highest level of abstraction—that is, it is not nested under any other tag—then the user identifies this by noting that it has no parent tag.

If the tag is at any lower level of abstraction—that is, if the tag is conceptually nested under an existing tag—then the user identifies this by noting the parent tag once the name and aliases are recorded.

If a tag needs to be edited, this can be completed by selecting it and changing any of its content, including its parent-tag relationship.

If a tag is deleted, this deletes it from the hierarchy and also removes it from any study. A tag can also be "cascading deleted", meaning that both the tag in question and all tags that depend on it (that is, any "child" tags, "grandchild" tags, etc.) are deleted along with the "parent" tag.

Tags can also be merged; if merged, the new tag is given a single name, aliases are re-configured, and the parent tag is identified. If the tags have been applied to studies, their content is similarly merged.

Tags with the exact same name can be created so long as they do not have the same parent tag; if this is completed, then the parent tag 'pathway' is used to differentiate the two tags (e.g. if there is a "heart attack" tag under both "Patient Medical History" and "Outcomes", the two tags will be named "heart attack<Patient Medical History" and "heart attack<Outcomes".

In an embodiment, users can also import the tag configuration hierarchies from other nests. To do so, the user examines a list of all nests to which the user has access, and selects the one that most closely matches the current Nest in tag structure. Then, the existing tag hierarchy from the user-selected Nest is imported in full into the configuration page. The user can then edit the hierarchy to customize it to fit the nest's exact content using the same methods described above.

Once the hierarchical tags are configured, the included studies can then be tagged by users in the Sequential Tagging page. In this page, the user is presented with the full text PDF of a study. The user reads the study, and while doing so, identifies all concepts that match the tags that were configured for that nest. In the type-ahead drop-down, the user selects the relevant tag and copies in the text string from the study that relays information on the tag into the "text" box. The user then selects "Create", which applies the tag to the study and records the text excerpt.

In an embodiment, named "StudyViz", as tags are applied to studies, a sunburst diagram presenting the tagging hierarchy in a circular interface (with parent tags on the inner ring, and children expanding out from it) presents all tags applied within a nest. By selecting any segment of the sunburst diagram, the user can narrow the set of studies to display only those to which a single tag was applied. This set of studies is displayed to the right of the sunburst diagram. If the user selects two or more segments, the table displaying the set of studies will present only those studies to which all selected tags were applied. If any study within the table is selected, the user can view the abstract and metadata of the study, as well as all tags applied to it, the history of its search and inclusion, and a link to the full text.

Extraction:

The users then move on to Extraction. To do so, the user first configures Data Elements (contextualized variables reported in studies and extracted into the Nested Knowledge database). Then, in an embodiment that is similar to Dual Screening in that it is quality-controlled using inter-observer agreement, Extraction is completed in parallel by two researchers and then adjudicated by a third party.

Data Element Configuration:

To configure Data Elements, the user is presented with the tagging hierarchy created in the Configure Tagging Hierarchy step. The user then configures two types of information gathered from studies:

Interventions: Interventions differ from Data Elements in that they define the groups within a study based on how they were treated (e.g. "test" vs. "control"). The Interventions for a Nest are configured by either (1) selecting a relevant parent tag within the tagging hierarchy that already has the Interventions as its child and grandchild tags or (2) building a new Intervention-focused hierarchy. The user confirms the completeness and correctness of all Interventions within this hierarchy, which will be presented during the Data Extraction steps as the options for naming patient groups within each study.

Data Elements: The user then is presented with an interface displaying all tags that were not used to name Interventions. The user then selects each tag that will be used as a Data Element. In order to create a Data Element, the user selects a tag, and:

Identifies it as Continuous, Dichotomous, or Categorical in nature.

If Continuous, the user provides the following information on the Data Element:

"Reported At"/Timepoint. Options:
Baseline—at first patient presentation
Follow-up—at timepoint subsequent to first presentation
Both "Reported As"/Statistic. Options:
Mean, SD (default)
Median, IQR
Unit
Direction
"Lower is better" (as in, a lower number is considered better for the patient)
"Higher is better" (default)

If Dichotomous, the user provides the following information about the Data Element:

"Reported At"/Timepoint. Options:
Baseline—at first patient presentation
Follow-up—at timepoint subsequent to first presentation
Both "Reported As"/Statistic is only given one option: n/N
Direction
"Lower is better"
"Higher is better" (default)

If Categorical, the user provides the following information about the Data Element:

"Reported At"/Timepoint. Options:
Baseline—at first patient presentation

Follow-up—at timepoint subsequent to first presentation

Both

"Reported As"/Statistic is only given one option: n/N

Categories:
  User can configure any number of categories
  User names each category (free-text)
  Order of categories can be used to imply ordinal categories This configuration of a tag provides the context necessary to complete automated statistical analysis of any Data Element gathered into a Nest. By configuring hierarchical Interventions, the user establishes the patient groups that will be reflected in a Nest; by configuring contextualized Data Elements, the user identifies which variables to gather and prepares automated statistical analysis. Both configurations can be edited at any point, even after Extraction is complete.

In an embodiment, the user can skip the Tagging step entirely. In that case, when configuring Interventions and Data Elements, the user will be required to enter the names and parents of each one before moving on to Data Extraction.

Then, once complete, two researchers are prompted to complete dual extraction to ensure the data drawn from studies is quality-controlled.

Data Extraction:

In an embodiment, once the two researchers have been prompted for data gathering from each study, these two separate researchers gather the data from each study in the following extraction steps, followed by inter-observer agreement quality-control:

1) Each study's metadata are populated automatically by the proprietary software from the database.
2) Each study is then queued sequentially to two users in Sequential Extraction.
3) Each user identifies all patient groups within the study by noting the Interventions. For each group, the total population of the group is recorded at both Baseline and Follow-up timepoints.
4) Each user reads the study and fills in the relevant metrics (defined as an 'instantiation' of a Data Element, or the specific number or set of numbers representing a given study group's data). This is completed for each patient group, at each relevant timepoint.
5) Each user completes this for all Data Elements across all patient groups. Then, the user finalizes a study and is presented with the next study in the queue. Both users proceed until all studies are gathered.
6) Then, an algorithm compares the metrics gathered by each user for each Data Element. Wherever there is 'agreement' between the users, the algorithm marks the metric as finalized. Wherever there is disagreement, this disagreement is presented to the third-party adjudicator, who enters the correct metric and finalizes it, and repeats until all disagreements are adjudicated.

Vitally, if the study is multi-arm (that is, there are distinct populations for which data are reported separately), the study is marked as multi-arm and each arm's data are gathered separately. Each researcher also reports the units used in each instance, and each differential unit type (mean vs. median, for instance), are reported as separate data elements.

Once both researchers have gathered data from all studies, the proprietary software automatically adjudicates and determines which data points "match" between reviewers and that therefore are likely representative of the underlying study. All data points that do not match are sent to the third-party adjudicator, who reads each study and determines what the final value is for each of the conflicting data points. Furthermore, the proprietary software flags statistical anomalies from any category for confirmation by the third-party reviewer that these anomalies are indeed the reported values. Anomalies are determined based on variance from the mean values for each data element; values outside of the 95% confidence interval for any data element are considered anomalous.

Statistical Power: Statistical power is retrospectively analyzed for each study using standard binomial and mean difference power tests. Study population size is drawn directly from the source study. Effect size & variance estimates are drawn from an aggregate network meta-analysis model, dependent on the treatment arms of the study. Significance levels are parameterized at the field of study convention (typically 0.05). For studies with more than 2 arms, the relevant hypothesis test & test statistic are analyzed, if stated in the study, else, all pairs of arms are contrasted and weighted average (using study arm size) power is computed.

Our reviewers then analyze the risk of bias based on the following existing analytical frameworks, which are built into Sequential Extraction as a set of fill-in-the-blank forms:

If the study is a randomized trial, the Randomized Trial Risk of Bias 2 test.

If the study is not a randomized trial, the ROBINS-I test.

The referenced risk of bias reports is completed by both reviewers independently and adjudicated by the third-party adjudicator.

Once third-party adjudication of all Data Elements and risk of bias forms are completed, they are fed back into our proprietary software. However, as methods & format of data reporting within fields can vary widely & the software requires homogeneous data structure, the data must be generalized first.

Data relevant to studies are generalized by the addition of:
  An assimilation of the treatment to a hierarchy.
    If a study arm uses one of many possible therapies as treatment, the lowest common parent in the hierarchy is selected as the study arm treatment.
    If a study arm treatment consists of several therapies, they are all maintained, but a "major" treatment is specified
  Date of collection (in case of amendments)
  Publication metadata, obtained from online databases:
    Journal, volume, issue, and pages
    Keywords
    Number of citations, to date
    Author affiliations Furthermore, each data element is tagged or associated with:
  Classification of measurement
  Patient background characteristic
  Patient outcome
  Treatment method (e.g. magnitude of dosage)

In an embodiment, the data schema used by the software represents an abstraction of the concepts & objects underlying research in clinical medicine. The abstraction provides generality to otherwise heterogeneous data sets, allowing software applications to consume data sets across research questions in a singular and consistent manner.

In a non-limiting example, each box of a representative data schema represents a table (a container for data), with the table name as the first row, and a shortened listing of data attributes (qualities of each object in the table) as the remaining rows. Arrows represent a "has a" relationship, e.g. a "study" has one or more "study_arm" objects. The instant innovation displays a variety of statistics, including odds ratios, correlation coefficients, power, and associated inferential statistics (p-values and confidence intervals). These statistics are derived from study summary data on every user web request.

In an embodiment, an odds ratio (OR) contrasts two treatments to measure an effect on a binomial outcome. When presenting binomial data (e.g. mortality) or other data that has been binarized by convention (e.g. mRS), the instant innovation computes ORs and associated inferential statistics to demonstrate effects. ORs can be evaluated on a study by study basis, or studies can be aggregated to compute a total OR.

Network meta-analysis (NMA) is a method of computing aggregated ORs from many studies. In a non-limiting example, the instant innovation uses the open source software "shukra" to estimate a fixed effects NMA. The Haldane-Anscombe correction (adding a half count to each contingency table cell) is applied to correct for zero counts; inferential statistics are drawn from log-transformed modeled ORs using a Gaussian approximated null distribution.

For presentations requiring per-study ORs against a target treatment (usually a control), ORs are directly computed as possible, or they are estimated using the NMA. In the latter, indirect case, ORs are computed by multiplying through the observed & NMA ORs. For instance, if a study investigates treatments A & B, and the target treatment is C, the indirect OR is estimated:

$$OR_{AC} = OR_{AB} * \widetilde{OR_{BC}}$$

where $\widetilde{OR}$ is estimated by the NMA. For any downstream inferential statistics, the contingency table is derived using the study population sizes and the OR.

In the indirect and direct cases, inferential statistics are provided for ORs using a Gaussian approximation:

$$\log(OR) \sim N(\mu, \sigma^2)$$

with estimators:

$$\hat{\mu} = \log\left(\frac{\frac{n_{11}}{n_{12}}}{\frac{n_{21}}{n_{22}}}\right)$$

$$\hat{\sigma} = \sqrt{\frac{1}{n_{11}} + \frac{1}{n_{12}} + \frac{1}{n_{21}} + \frac{1}{n_{22}}}$$

q confidence intervals are derived as the exponentiated $$\frac{1-q}{2}$$

and $$q + \frac{1-q}{2}$$

quantiles of the approximating distribution. P-values are derived as the sum of tail probabilities from a Gaussian with parameters $\mu=0$ and $\sigma^2 = \hat{\sigma}^2$ In an embodiment, all correlation coefficients displayed via the instant innovation are Spearman's ρ. For study level data elements (i.e. metrics which studies report as a mean), the raw data element is used as the variable to be correlated. For missing contrasts, the study is dropped from the correlation computation for that specific contrast. Inferential statistics are computed using the Fisher transformation:

$$\tanh\left(\operatorname{arctanh}\left(\rho \pm \frac{q}{\sqrt{n-3}}\right)\right)$$

where q is the Gaussian quantile of the desired confidence level.

It is acknowledged that the derived statistics are not consistent for inference on patient level characteristics, since the distribution underlying any summary statistic is unknown.

Statistical power of inference on study level binomial outcomes is computed using the power test for the binomial proportion test. Significance levels are defaulted to $\alpha=0.05$ and accept user input. Effect size & variance both default to the NMA estimated parameters. Statistical power of the estimated aggregate OR is drawn from the NMA methods. Note, this power pertains only to the inferential capability of the NMA, not of the component studies.

Once the above are completed, the only activity taken with respect to a given Nest apart from fixing errors or bugs is the repetition of the above process every month, except with the study inclusion criteria limited to studies published in the previous month. Beginning on the first day of each month, the system does an automated search for any new studies, and if any are found that pass the initial exclusion filter, the inclusion, data gathering, adjudication, processing, and publishing methods are followed with respect to any new study, which is added to the existing nest.

Vitally, to ensure proper archiving, our site's full set of presented data are recorded each month in case review of historical records is necessary.

All of the above methods are contained in company Standard Operating Procedures (SOPs); furthermore, for each nest, a full nest-specific SOP is drafted regarding the data gathering processes undertaken by reviewers. If any novel methods are created for data gathering or management, they are integrated into the SOPs and proprietary software.

If an error or bug is noted internally or by a user, our team completes a full review of the search criterion or study in question and re-publishes to the site. If it is a presentation issue and not a data issue, then the issue is dealt with by the UI team.

In an embodiment, the instant innovation is a research access and visualization site. Our method of organizing and directing users is as follows:

A user attempting to figure out how different characteristics and/or treatments influence outcomes, the user must know only what field of study she is interested in, usually identified by disease state (for instance, acute ischemic stroke). In an embodiment, the instant innovation includes a search bar that directs the user to the most relevant Nest (using Q Search).

Users come to a Landing page, which contains the Q Search, as well as a visualization of the centroid clustering used in Q Factor. From there, they select a "Nest" based on the disease state and therapeutic method. They then go to the "Nest Hub," which is a visualization of the research questions of interest and the number of studies comparing any given therapies. From there, either through clicking on connections between studies (which are live links to tables containing the underlying data), or by using the Navigation Pane, users can explore any of our rapidly-growing set of visualizations. Each visual displays a different perspective on the same underlying data (gathered based on the methods above) and has links through to either other visuals or to source materials. Scroll-over elements also enable deeper views of the data involved in many visuals.

Lastly, this represents a snapshot of the current active visuals on Nested Knowledge (as captured through using the AIS Nest as an example). The number of visuals and their functions is constantly expanding, and one larger characteristic of the site is that novel visuals can be added (or features added to existing visuals) without disturbing the general structure or the existing visuals. The very process of creating visuals is in and of itself an important and complex set of ideas, as described below.

Nest design is a balance between using existing features/visuals (to maximize scalability) and creation of custom features (to maximize meaningful communication within a subfield).

The process consists of four phases:
1) Through Delphi surveys and external consultations, the team of experts consults with our programmers, examining libraries of visualizations and selecting those that could be useful for representing the data in question for a given disease state or topic. All Nests that report data for this disease state or topic use the customized visuals created through this process.
2) Our team then constructs not only the preliminary visuals (with preliminary data drawn from the research effort) but also creates the Nest structure—where in the navigation pane any given visual is placed and from where on other sites a page may be linked to—including all "edges". These edges represent the connections and links between sites, and are created not only in visual form in the Navigation Pane but also programmed in based on the conceptual connections between different types and presentations of evidence.
3) The expert team and programmers review the preliminary site in consultation with the data gathering leads, with the following major goals:
   Ensure that all visuals and connections are conceptually aligned with the organizational ideas of the experts.
   Ensure that the data will be fully represented and representative of the underlying studies; furthermore, data-to-be-presented is selected by a combination of input from experts (as to what is important) and data gatherers (as to what is commonly reported).
   Identify smaller features (scroll-over figures, confidence intervals, selection menu items, explanatory sections) that need to be added before launch; the programming team and expert team iteratively add and review features until the experts are satisfied.
   The experts then log in through our accounts page and leave customized comments throughout the site based on their initial conclusions from the nest's visuals. These constitute the foundation of comments on which the larger feedback-based aspect of the site is built.
   Then, following quality control and executive review, the initial Nest is pushed to the site.
   Iterative changes can be made to the site based on ongoing feedback and meetings with experts and based on expansions in the tools of our programming team.
4) Once design is complete and the Nest is pushed to the site, major changes can be made when new features and visuals are available, based on repetition of the above processes.

In an embodiment, the landing page is a visualization of centroid clustering of studies based on the data they include, as explained further in Q Factor. The page shows how similar reporting is among a group of studies, and our team then labels groups of studies based on the disease state and the therapies for which nests have been created. Each study's node is a different size based on the size of the patient population, and upon scroll-over of a given nest's studies a box appears showing which studies were included in that nest. If a study is clicked on, the user is linked directly to the relevant nest.

The Nest Hub is a network diagram of all the therapies reported by studies included in the nest. Each node represents a therapy of interest, and the lines between each therapy can represent a range of things (which can be selected by selecting different tabs on the Nested Knowledge site):
   The number of studies comparing those two therapies total
   The number of studies reporting any specific outcome between two therapies
   The number of total patients in studies comparing those two therapies
   The number of total patients for whom outcomes were reported between two therapies
   The differential outcomes between the two therapies (represented by a color gradient and/or labelling of the odds ratio), for any outcome reported by the therapies in question.
   (In the future,) any other numerical comparison between data elements gathered in our research; nodal connections are not limited to comparison between therapies and could be used to compare any set of values across our dataset.
   Non-limiting Examples:
   Nodes could represent studies, and connections could represent shared authors or citations
   Nodes could represent discrete patient populations, and connections could represent outcomes
   Nodes could represent authors, and connections could represent shared papers Effectively, the Nest Hub uses a visual design that has been previously used by network meta-analyses but creates scroll-over values, explanations, editable inclusion of studies in a selection-based legend, and links through to underlying data.

In an embodiment, examples of data presentation may include:
   Scroll-over values: Upon scroll-over of a node, the connections from a given node are brought into the foreground while all other connections are "greyed out." Furthermore, if a specific connection is scrolled over, a table appears in the corner of the screen displaying all studies from which those values are based, and clicking on a connection brings users to a research table based on the connections.
   Explanations: For scroll-over of any term/word, a definition and link to sources describing it further pop up to enable deeper understanding of the values being compared.
   Selection-based Legend: a legend that enables users to alter certain portions of the site.
   Links: As described in "Scroll-over values," clicking on a connection links through to a research table of the studies underlying that connection. These links are altered based on the research questions being represented by the Nest Hub (listed above).

In an embodiment, the navigation pane is a small, interactive set of interconnected visuals that are miniature versions of each of the pages described below. It is present in the upper right portion of a Nest on all pages, right above the Selection Legend.

In a non-limiting example, the Navigation Pane shows up to nine miniaturized pages, and users can navigate to any of these pages by simply clicking on the miniaturized picture of the page in question. As many pages can show multiple comparisons, the Nested Knowledge team selects "preset" versions of each page that is shown after the page is navigated to. Once on any given page, the user can alter which data are displayed from this "preset".

While users can navigate to any part of a Nest using the Navigation Pane, there are also many portions of the site that are interactive and allow users to access other parts of the Nest based on their specific interests.

This navigation is completed simply through clicking on different Nest presentation elements throughout the site; specific mechanisms are described throughout the following descriptions, but the overall function is that, for any given presentation of data, there are often underlying data that users may want to examine in more detail. Since Nest pages vary in their amount of detail (especially from combined data to study-by-study data), the pages with combined data generally link through from each data point through to a Nest page that shows the studies that went into that combined data. When navigating based on clicking on data points, the user is not brought to the "preset" version of a Nest page but instead to the exact data that went into the data point she was examining.

From each study-by-study Nest page, users can access the underlying studies by clicking on "View" links associated with each study. If users click "View," a new tab pops up showing the MedLine information on an article. MedLine contains the article citation information, abstract, and DOI of an article, as well as a link to the full article in some cases, and is a public database of indexed medical studies.

Below the Navigation Pane on every page of the site, in the lower/middle right of the page, is a legend describing the specific Nest page's presentation, statistics, and data elements included. The legend is "selectable" because, on top of having descriptions of what is included in a site, it also enables users to alter certain portions of the site. Non-limiting examples of selectable elements include:

Color gradients: Anywhere on the site with different color palettes or gradients, users can select from half a dozen color palettes (for instance, on the Therapeutic Comparison page, users can select a blue-to-red, rainbow, green-to-grey, or green-to-copper gradient to represent odds ratios.

Years of study publication: On any page, users can select which years of publication they would like studies represented from. For instance, if users want to see only studies from 2012 forward, they simply select the study range 2012-2019 (or whatever the current year is).

Therapies included: Users can select a subset of the therapies presented in a nest.

Geography: Users can geographically restrict the studies included based on the location of the first author's institution.

Hierarchy of Evidence: Users can restrict which studies are included based on the Hierarchy of Evidence.

The legend enables users to access the specific methods for creating the Nest page in question.

Further descriptions of basic Nest features and symbols, such as the asterisk system for denoting significance, can be accessed from the legend. Users simply select a link and this description drops down from the top of the screen.

The therapeutic comparison table presents a great deal of data and some inferential statistics in a single color-coded table. Its main goal is to compare the efficacy of the therapies included in a nest.

The therapies of interest are listed in the columns (with scroll-over descriptions and links to manufacturer websites or other information on the therapy). The major outcomes of interest for the Nest are listed in rows (as determined based on the literature review methods; the most commonly reported outcomes are selected for reporting with expert advice).

Each cell represents the outcome of interest across all studies reporting that outcome across the literature review. Binary outcomes are reported as both an incidence rate (n/N) and a percentage; ordinal or other variables are not reported in the Therapeutic Comparison table.

On top of these descriptive statistics, odds ratios and 95% Confidence Intervals (CIs) are calculated using network meta-analysis methods for all multi-arm studies (defined as studies for which multiple patient populations, treated with different therapies, are reported). Odds ratios are displayed as text and CIs are displayed as ranges. P values (indicating statistical significance) are represented both by asterisks and by bolding of the text and border of a cell. These odds ratios are all calculated based on a "baseline therapy," against which all other therapies are compared, which is chosen by the design experts based on the standard of care of the field in question.

Furthermore, these odds ratios are represented through the color spectrum for each cell. Users can select their spectrum of choice, and then one color represents a "negative" outcome (that is, that the therapy in question underperforming the baseline therapy), while the other represents a "positive" outcome (that is, that the therapy in question outperformed the baseline therapy).

Each cell also has a scroll-over that leads to a Forest Plot popup in the lower right of the screen. These forest plots display the individual odds ratios and CIs of each study included for that cell. These forest plots can also be accessed by clicking on the cell.

The forest plots follow the general practices in presenting odds ratios and confidence intervals for comparing two therapies; there is a forest plot for every therapy compared to baseline therapy, with respect to each outcome of interest. These forest plots not only show each study included for a given comparison but have a brief legend showing how the presentation of patient population and odds ratio work in the forest plot, and then a link to each study in question.

The multi-factor comparison is linked to from the Nest Hub. Each therapy is shown in a row, and above the first column (denoting each therapy) is a pie chart showing the total number of patients and the number included for each therapy.

Then, there are three columns, each with a pie chart at the top and then horizontal bar charts for each therapy. These bar charts show the number of patients that had any baseline characteristic or outcome of interest (and can be based on binary or ordinal data). Users can select which characteristics/outcomes they wish to view (up to three, since there are three columns of bar charts) in drop-down menus. Thus, users can visually compare the patient populations and performance of therapies based on the bar charts. These bar charts also enable shift analysis. Shift analysis is a common method for comparing outcomes across devices using horizontal bar charts.

The correlation matrix compares one set of values, typically the patient background characteristics, in the columns, to another set, typically the patient outcomes, in the rows. This can be completed with either patient-level data or study-by-study data. Each cell contains either (or both) a numerical value and/or a colored circle. The circle color represents either a direct or indirect correlation (generally represented by Spearman's coefficient); users can select which colors represent which correlations. The circle size represents the strength of the correlation, and if users scroll over the cell, a bar appears at the bottom right showing the 95% CI for the correlation. The width of the 95% CI is represented by the transparency of the circle; the wider the 95% CI, the more transparent the circle (such that a very narrow confidence interval would have transparency near 0% and a wide confidence interval would have a transparency near 100%).

Each cell in the correlation matrix links to a Causation Plot that represents the correlation with the column-value on the x-axis and the row-value on the y-axis, and the correlation coefficient shown in the graph area. This enables users to see not only the general correlations across characteristics and outcomes but also the individual datapoints informing these correlations.

The Causation Plots are x-y graphs that enable users to compare any characteristic, treatment choice, or outcome against any other characteristic, treatment choice, or outcome. These variables are selectable in two drop-down menus near each axis.

Once the two axis values are selected, if the data presented are patient-level, a simple correlation graph with each patient being represented by a dot and a "line best fit" with a shaded 95% CI are displayed, along with a correlation coefficient. If the data presented are study-by-study, each study arm's average or summary value for the variables of interest are represented on the graph by a circular node. The size of the node represents the size of the patient population, while the name of the study and the arm are shown in text in front of the node. The color of the node further indicates which therapy is represented by a node. If users click on a node, then a table appears in the bottom right of the screen showing all data collected from that study, divided out by study arm; there is also a "View" link to that study's MedLine. While this is open, all other study arm's nodes are greyed out, and a user can return to seeing all studies by clicking on the node again.

The Research Tables simply display a meta-analytical table, but are customizable. Each table has a row for each study arm, and in the "preset" table, each study included in a Nest is displayed. If the Research Tables are accessed from a Nest Hub comparison, the studies are limited to those of interest to the user based on their selection in the Nest Hub. The studies included can be further limited using the selection legend.

The table's first column displays the study name (for "named" studies, the study name designated by investigators; otherwise, the first author's last name et al.). The second column displays the study arm (based on therapy used), and the third displays the year of publication. The rest of the columns are selectable by users. Users use drop-down menus to display up to 5 characteristics/outcomes concurrently, in any order based on user preference. Thus, this table effectively displays the data of interest to a user and can be customized concerning either the studies included or the data elements of interest. The last column has a link through which the MedLine version of a given study is accessible.

Through a drop down menu, studies can be grouped either by therapy used or by "arm" (that is, group all arms of a study together). The preset organization is for studies to be organized by year of publication and then alphabetically.

However, once a table is populated with data, users can sort studies from highest to lowest value based on any column. If a user clicks once on a column heading, the table is sorted so that the studies with the lowest value in that column are at the top, and if a user clicks again, the table is sorted so that the studies with the highest value in that column are at the top. Thus, once the inclusion/exclusion is completed and the data elements of interest are selected, users have created a customized Research Table displaying all data of interest to their meta-analytical search and research.

Lastly, users can download their customized Research Table by clicking "Download.CSV" at the top of the page, and thus have a customized meta-analytical table created through the Nested Knowledge interface that they then analyze independently.

While Nested Knowledge is based on individual studies and not meta-analyses, in order to assist with users finding other presentations of combined data, we have a separate tab on the Research Tables page displaying a full list of all studies that were excluded from our inclusion/exclusion. These also link to the MedLine page for each study.

In an embodiment, there is also a Nest page displaying all metrics that Nested Knowledge has developed. Currently, this page shows studies ranked and graphed based on the Hierarchy of Evidence and Q Factor, but the number of metrics is consistently expanding. These are generally represented by ranking studies in a table and also showing a graph (for Hierarchy of Evidence, a bar chart of each of the rungs in the hierarchy; for Q Factor, a cluster diagram). These metrics are not drawn from the underlying studies (unlike the rest of the Nest pages) and supplement the data from the studies with weighting of their contribution based on potential bias, completeness of reporting, and other characteristics that are not directly reported in studies.

The full method of data gathering is available for viewing and downloading as a PDF. For portions that are qualitative but similar across nests, such as expert design, these methods are pre-written by Nested Knowledge staff; for portions that are "structured" and thus included in our data schema, such as metadata scraping, the relevant search terms, data gathered, dates, and personnel involved are automatically populated into individual methods documents.

In an embodiment, as users interact with the nest, it is possible that they could find errors, suggest improvements to presentation, or come up with conclusions worth sharing with the research community.

If users find errors in the site, they can, in a non-limiting example, right-click on the portion of the Nest page containing the error and select "Report Error or Suggest Alteration." This brings up a comment box in which the user can describe the error (if the data are thought to be incorrect or incomplete) or the potential improvement (if there is a visual or presentation choice that the user believes should be changed). These comments are logged on the Nested Knowledge internal site and sent as an email to the leader of the Data Gathering team for that specific nest, who adjudicates how the error or suggestion should be addressed.

In an embodiment, Applicants also anticipate that users could make conclusions based on the rich data presented in any given Nest page. If a user has a conclusion she wishes to share, she can right click on the relevant data point and select "Make Public Comment."

This brings up an interface where the user can enter text describing their ideas, attach images, and insert citations. Once submitted, the comment is sent to the leader of the Data Gathering team for moderation. The review is based solely on whether the comment is relevant and medically focused, not on the content of the comment, after which point it is made public on the site and viewable upon scroll-over of the data point in question with the username of the commenter.

Because scroll over viewing may become difficult, a "Comment" feed can also be placed on the far right of the screen showing all comments on any Nest page. Clicking on a comment will also take users to a full page containing the comment, images, and citations, with the option to reply.

If users see a comment they find useful, they can also click the "Impactful" button that pops up along with the comment. The comment also displays the "Impact" based on number of such ratings, and the Comment Feed is ranked based on Impact.

Interventional medicine (e.g. medication, medical devices, physical therapy, etc.) has spawned a wealth of research questions around the efficacy of various interventional treatments. These questions are often empirical in nature, requiring clinical trials to directly observe the treatment's effect on patients. The results of clinical trials are usually shared with the scientific community via publications in academic journals. While the Common Data Elements initiative of the National Institutes of Health has recommended data elements to collect with each trial based on the subject matter in question, medical publishing has no centralized method of either measuring or enforcing data harmonization on a subfield-by-subfield basis. There are also several levels of evidence below clinical trials-namely, prospective/cohort studies, retrospective/case-control studies, and case series-which provide evidence from clinical practice to supplement trials and, in the best case, report similar data elements.

These publications are then combined into meta-analyses and systematic reviews for interpretation in studies that extract major data points and compare them across studies of the same research question. Meta-analysis is a method of combining multiple clinical trials investigating the same research question into a single body of work. In order to effectively combine clinical trials and other studies, publications must report homogenous "data elements"—that is, they must use the same categories of data so that they can be compared directly; any missing data elements or reporting of similar but non-comparable data elements undermines the meta-analytical process, as the data elements that are mis-reported could be influential on combined interpretations.

Data elements in medicine can be broadly grouped into patient background characteristics, treatment variables, and patient outcomes. Variations across the observed outcomes in studies can then be correlated with the characteristics and treatments to help determine potential causes of better outcome for further study or examination. Medical publication currently uses amalgamated patient outcomes in publication (such as % male, median age, % mortality), rather than individual-level data, making it vital that not only the type of data but the method of amalgamation and reporting be harmonized across studies of the same research questions and, optimally, across entire fields of medicine to maximize the data available to examine novel cross-population questions.

There is a critical need, therefore, for a method of measuring the level of data reporting quality/completeness in a given study, where the best-performing studies report all data elements reported commonly in studies of the same research question (or in the same sub-field). The worst-performing studies in this metric would be those that either failed to report data common in related studies or that reported the data using units or measurements that prevented comparison with related studies. No such metric exists, as no previous organization has gathered the full set of reported data across an entire subfield in order to allow comparison of data reporting.

Nested Knowledge has enabled this new capability to combine data from across studies in a subfield. Thus, based on the data gathered, Nested Knowledge proposes a Harmonization Factor ("Q Factor") that can be used to assess how well a study reports the data that would be necessary to complete a meta-analysis based on its findings. The benefits & uses are:

Provide guidance to journals and authors in advance of publication of what data elements are common in a given field Incentivize researchers, when they are publishing studies, to report a similar set of data elements to make their studies more amenable to meta-analysis Justify a study's inclusion or exclusion in a meta-analysis.

Quantify the scientific value of a study to meta-analytical research questions

In a non-limiting example, consider a set of four clinical trials that each report a very different set of metrics, resulting in little overlap in what they report. For example, the Rate of Serious Adverse Events (SAEs) and Relapse Rate may each be reported in only one study. In such a case, meta-analysis would be effectively impossible because the outcomes could not be compared across characteristics because of the paucity of connections available to analyze in combination. Despite the failure of these study authors to make effective meta-analysis possible, the authors did establish at least a subset of the data elements reported in their field. Such partial reporting can permit each study to be "scored" on a metric predicated on the assumption that a study that reported all data elements across the studies was representing the vital data for the field as recognized by current experts. Each individual study should perform badly on such a metric, and a weighting function could rank them based on the frequency of each data element.

In a non-limiting example, a more ideal set of studies for a meta-analysis might include much more overlap between the data elements reported in each study. This would similarly establish the data elements reported in a field, but each study here should score much higher; again, the importance of each data element toward the final score can be weighted based on its frequency in relevant studies.

Lastly, the "relevant field of study," since the establishment of data elements of interest will be predicated on practices within it, is extremely important to define based on community, and not arbitrary standards. In this case, Q Factor's "relevant fields of study" will be based on centroid clustering of all studies gathered in Nested Knowledge's meta-analyses. While inclusion/exclusion will initially depend on the criteria used by Nested Knowledge, as entire fields are covered, centroid clustering should show discrete differences between field-based reporting practices. That is, fields of study should naturally differentiate based on the types of data they report (indeed, a field of study in clinical research is effectively the group of publications that report similar interventions and outcomes).

Q Factor indicates how ideal a study is for a meta-analysis by quantifying how similar the set of data elements it reports are to the consensus standard (as represented by the reporting practices within a given field of study). Q Factor properties include:

1) A Range from 0 to 1

0 means the study reports none of the data elements reported in its field 1 indicates perfect compliance with standard data element reporting Anything in between indicates relative compliance—the higher the better, but likely comparable on a study-by-study basis only within a field of study.

Entire fields can also be compared based on their average Q Factors.

2) No penalty for over-reporting i.e. if a study reports a data element no other study reports, its Q Factor is the same as if it didn't report that data element 3) Empirically derived reporting standard The reporting standard for a field is algorithmically & statistically determined from the reporting practices of the field in question, so there is no expert or arbitrary element to standard determination.

4) Q Factor is adaptive to continuous and categorical data types

Categorical data that aren't reported with full category granularity (due to e.g. binning) are penalized 5) Q Factor is robust to research fields that present several reporting standards by algorithmically reporting patterns in the field.

6) Q Factor weighting of data elements favors recent data elements

A field specific exponential-decay function is used in weighting the data reporting practices of older studies for the purposes of determining the relative importance of each element.

To be clear, this does not mean that newer studies automatically get higher Q Factors, simply that each individual study is judged against a standard that gives preference to the most updated reporting practices.

The following is a non-limiting example of a step by step procedure for calculating Q Factor, starting from sourcing raw data (studies).

In an embodiment, inclusion and/or exclusion criteria for the study list is determined by the Nested Knowledge team, with the assistance of field-leading experts, to match the inclusion criteria of conventional meta-analysis in a field. The study list is therefore predetermined for the purposes of calculating Q Factor. Similarly, the Data Gathering process is considered to include all data elements reported in each study with high fidelity to the original publication.

Every step in the below description includes an explicit computation on an example research topic: acute ischemic stroke. This field is an early test-field for Nested Knowledge, but the calculations will be the same for other fields and indeed will be combined with them using centroid-clustering techniques to create field divisions. To simplify the computations, the data represented here are fictional.

Relevant studies for Data Sourcing are determined using a keyword literature search. A study is valid if it matches the keyword search, considers a trial or study on a population with a given disease state and/or intervention under examination by a medical subfield, or passes the inclusion/exclusion criteria applied by the Nested Knowledge Data Gathering Walkthrough.

From each valid study, the following types of data elements are extracted for consideration, using the units from and matching the exact data element reporting of each paper: Background characteristics-data descriptive of the population being studied, particularly before any treatment effect was applied, Treatment variables—any pre-, intra-, or post-operative interventions or other actions taken by the treating team, and Outcome metrics—measurements of the treatment effects on the study population.

Treatment of categorical, binary, and ordinal reporting is outlined below. Any ancillary data elements that are not related to the study reported in a given publication, such as previous study results or metrics not related to the study population, are not considered for calculating Q Factor. Note: many studies are multi-arm, comparing outcomes between defined populations that differ along a given variable (usually a treatment strategy); for the purposes of Q Factor, data elements are gathered for all arms and Q Factor calculations are completed for each arm and then averaged (with each arm weighted equally) to give the final score for that study.

In a non-limiting example pertaining to stroke studies, a keyword search for "stroke intervention", "stent retriever", & "contact aspiration" (which represent two major device types for stroke) is run against a medical literature database. Among the searched publications, clinical studies related to stroke intervention are included as candidates for the meta-analysis. Data are then extracted from the candidate studies. While most studies have 30-70 data elements, a simplified data abstraction would have fewer. Note that a patient can fall into one of multiple categories. Treatment variables could also be included, and would have the same calculations applied to them.

After extraction, the reported metrics are synthesized into a set of metrics appropriate for Q Factor calculation. Continuous data are synthesized to a single indicator metric: 1 if the metric is reported, 0 if it is not reported. Metrics sourced from continuous data (real values, e.g. Age) may be summarized using several statistics (e.g. median or mean) in the literature. In preparation for Q Factor calculation, different statistics of the same data are treated as the same, singular metric. For example, if study A reports mean Age and study B reports median Age, both A & B are reporting the singular Age metric.

Any data element that is reported as both a mean and a median is graded as complete (1 out of 1) if the mean is reported, and as incomplete but present (0.5 out of 1) if reported as a median in any given study; this is motivated by the fact that medians cannot be combined for meta-analytical analysis while means can be. Similarly, while ranges, standard deviations, and IQRs are useful in publications, their lack of relevance to meta-analysis means that they will not be given a value for consideration of Q Factor.

Metrics sourced from categorical data (discrete values, e.g. TICI), may be reported using various binnings in the literature. For example, in the raw data, study B reports 4 TICI categories (<=2, 2b, 2c, 3), study E reports only 3 categories (<=2b, 2c, 3), and study A reports only reports only binary categories (<=2b, >=2c).

In synthesization, categorical data are spread to two metrics, an indicator metric and a granularity metric. The indicator metric, represents if the data was reported at all (i.e. with any binning). Thus, any study that reports at least a binary version of this data element receives a 1 out of 1 for the indicator. The granularity metric, representing the proportion of all possible categories reported; thus, any study that does not report the fully granular data receives a graded score out of 1 for granularity based on how many granular points are given even though it may get a 1 out of 1 for the indicator. The relative frequency of fully granular reporting is calculated separately from that of the indicator to give effective weighting of frequency of granular reporting. In a non-limiting example, the synthesized stroke study data can be represented as a chart of figures or as a dimensionally reduced (2D) graphic in which each study is a point.

Within a keyword search, it is highly likely that studies may belong to several fields or subfields, where certain metrics are or are not relevant and may conform to several reporting standards, due to varying convention or poorly defined prior standards. Consequently, imposing a single standard on all studies within a literature search may not be reasonable.

Clustering is an automated method for identifying patterns & groupings in data; with clustering, we may identify plausible groupings of studies, each with their own distinct standard set of metrics. Any clustering algorithm may be used, and for Q Factor, the clustering strategy will be determined from the following based on the effective differentiation they give concerning fields of study. For example, k-means clustering & agglomerative hierarchical clustering have proven successful in past experiments. The parameters for the number of clusters can be expert recommended, or algorithmically determined using purity measures.

As stated above, we will initially cluster studies within each field of study (as defined by the inclusion/exclusion criteria used to find the studies in question). However, once data are gathered from enough studies, all studies can be clustered from across all search criteria, and groupings of studies can be found naturally through their reporting practices based on shared data elements. At this point, it is perfectly plausible to select a single cluster, where all studies belong to the same group & should conform to the same standard, and consider this a subfield for the purposes of medical publication. Thus, Q Factor can serve not only to show data reporting quality within a given field but also help define what studies can be effectively combined for the purposes of meta-analysis, helping to define fields of research as well as their practices.

The central tendency within a cluster represents the consensus driven standard in reporting. By using the centroid (mean) of the cluster, the consensus is effectively the average rate of reporting across all data elements. Thus, the central tendency is a visual representation of how closely studies adhere to the average practices of related studies, and studies closer to it represent studies that publish more in line with the average data published in the field. The centroid is a weighted average across all dimensions of all studies within a cluster. In effect, the centroid represents the average of any given study's conformance to optimal reporting, weighted for each data point based upon how commonly each give data point is reported in similar studies.

Because reporting and performance standards change over time, state of the art practices are most effectively represented in newer studies. Thus the instant innovation takes into account time decay for historical data. The time decay for any past study can be computed using any function, but a common choice might be exponential decay:

$$w_i = e^{(-t^*m/T)}$$

where T is the age of the oldest study (years since publication), t is the age of the $i^{th}$ study, and m is the maximal percent (0-1) penalty for the oldest study. m is domain specific, but m=0.25 was selected in our use case. It can be altered for any given field based on the expert understanding of the change in publishing practices over time.

For a given study, its geometric closeness to the centroid indicates how close to the standard it reports. As used herein, "geometric closeness" is a subjective comparison based upon human perception of relatedness of studies in an arbitrary geometric space. Effectively divorced from any discrete unit, a determination of "geometric closeness" is meaningful only in relative comparison. "Geometric closeness" is analogous to the idea of "distance," with emphasis upon the idea that studies "close" to one another in human perception will be "close" to one another in a numerical representation provided by the instant innovation. Distance captures this closeness in a continuous fashion and defines the harmonization factor. It is preferable to use an imbalanced distance function—that is, distance should only grow by under-reporting, not over-reporting. In this way, publishers aren't incentivized to ever publish less information.

A metric is the product of a function performed on extracted data points, and represents the score given to a single study based upon the many data points the study reports or does not report. For a given metric m and study i, the distance (or geometric closeness) is computed as:

$$d_{im} = \max(0, \underline{m} - m_i)$$

where $\underline{m}$ is the centroid point for metric m. All of the metric-wise distances are exponentiated and averaged (where M is the total number of metrics in the cluster and h is the "harmonization" or "Q factor" and "p" represents a penalty representing the extent to which divergences from the norm should be penalized. A large "p" means divergence is penalized more heavily.):

$$h = 1 - \frac{\left(\sum d_{im}^p\right)^{1/p}}{M}$$

We have found reasonable results selecting p=2 (squared distance).

For study A, Q Factor (also referred to as "harmonization" factor) was computed using:

$$d = [0, 0, 0, 0, 0, 0, .75 - .625] = [0, 0, 0, 0, 0, 0, .125]$$

$$Q = 1 - \frac{(.125^2)^{1/2}}{4} = 1 - .125/4 = .968$$

For study C, Q Factor was computed:

$$d = [.667 - 0, .333 - 0, 0, 0, 0, 0, 0] = [.667, .333, 0, 0, 0, 0, 0]$$

$$Q = 1 - \frac{(.667^2 + .333^2)^{1/2}}{3} = 1 - .746/3 = .752$$

Visually, the final computed Q Factor is inverse in magnitude to the straight line distance from each point to the centroid. Note that, in general, studies with smaller distance from centroid (e.g. A, B, G, E) have the highest computed Q Factor.

In a non-limiting example, the visual representation of Q Factor on our site may be derivative of the home page. The focus of the page is an x/y plot of the PCA visual dimensions (just as in the home page); points are studies, and the Q Factor may be represented as, but is not limited to such a limitation, color.

In an embodiment, beneath the x/y plot, a two-row table is displayed. The columns are:
  One column for row titles
  One column for Q Factor
  Remaining columns for each metric (data element) (e.g. mRS, TICI, etc.)

The rows are:
  Average—this row represents the average of everything highlighted in the plot (or everything, if nothing is highlighted)
    For the Q Factor column, compute the average Q Factor of highlighted studies
    For the data element columns, compute the reporting rate (each study gets a 1 if it reports that data element, a 0 if not)
  Hovered Study—this row represents the specific study
    For the Q Factor column, show the study's Q Factor
    For the data element column, display a check mark if the study reported that metric or display an X mark if not In a non-limiting example, a visual representation in which distance from the center of the cluster determines study reporting quality (closer=better) is indicated not only by color of the Q Factor nodes but also by vectors that appear on scroll-over.

The National Institutes of Health puts out expert defined standards for metric reporting; it outlines the ideal set of metrics to be reported within fields. Such metrics are standardized as "Common Data Elements" (CDE). It does not assess how well any individual study meets those standards. Q Factor can be seen as bridging that gap (providing an actual assessment). In addition, Q Factor does not rely on an expert defined set of standards, instead using what is actually reported by studies in the field as the standard.

In an embodiment, Q Search is based on the data gathered for Q Factor. For this search, all data elements gathered through our processes are treated as selectable search terms in a limited search of the articles included on the site. Users come to this search page and enter or select all data elements of interest to them in a meta-analysis. So long as Nested Knowledge has gathered the comprehensive subfield data relevant to the search, it will return all articles reporting the data elements searched in the Q search. This will effectively enable users to complete search, inclusion, and data gathering for a literature review in a single Q Search, replacing current search methods (MedLine and similar database keyword searches) with searches that are grounded not in the text or MeSH terms used by authors but in the very data being sought by reviewers.

Q Search uses the same data elements as Q Factor. Effectively, the central function of Q Search is to include and exclude studies from a user's search based on which data elements the user is interested in collecting. Q Search data elements include all of those gathered for Nested Knowledge, and thus the search's underlying functions incorporate the data gathering activities described above.

When a user searches on Q Search, she types a field-limited text search for data elements. Her search is limited by the data elements that exist within the Nested Knowledge database through text-search limitations. Effectively, a user cannot search for data elements that have not been gathered, and the text-search limitation prevents searches from including any non-data-element. Vitally, when these data elements are included in Q Search, all medical synonyms (as seen throughout the data gathering process) are recorded, and when a user searches a synonym, they are directed to the data element that is synonymous with their request. Lastly, users can search multiple data elements using Boolean string searches, in which case inclusion and exclusion follow the conventions of Boolean searches.

Before typing in a search term, the user selects a field of interest, usually defined by the disease state of interest (such as Acute Ischemic Stroke, intracranial aneurysm, etc.). For the search, articles from outside of the field of interest are excluded. The Fields of Interest are determined in one of two ways. First, by employing data gatherer designation: early in Nested Knowledge's data gathering, our gatherers designate which Nest studies will go to, which provides information as to which field a study is a part of. Second, be employing Clustering: Once the data gathered for Nested Knowledge expands to cover many disciplines, the "Field of Interest" can be discerned based on which studies are clustered closest to each other based on Q Factor's clustering. A user can select multiple fields of interest if she wants studies and data from across multiple disease states, which simply expands the range of studies that could be included with the aforementioned methods.

In an embodiment, the text-search function, unlike the field-limitation (which is a pre-search criterion selection), operates while the user searches. When the user begins typing in a data element, a drop-down menu appears with suggestions of all data elements that this search could represent. This drop-down takes into account synonyms, different word orders, and also searches based on the metric (e.g. "modified Rankin Scale score") and outcome (e.g. "neurological outcome"). It also enables selection of different presentations of the same data (e.g. ordinal vs. binary). The user is then able to either continue typing or select from the dropdown menu, and if she uses Boolean search strings, multiple terms can be searched at the same time. This ensures that users will be able to search for studies only within the realm of data elements collected on Nested Knowledge.

As described above, users will be able to limit their search by the hierarchy of evidence, years published, and other study characteristics through our selectable legend. Once the search is completed, the studies in question are populated into the user's screen in the form of the Research Tables.

If users want to further restrict the studies that they have found, they can select columns in the Research Table, right click, and select "exclude studies without [data element]."

As the Q Search can effectively serve as an inclusion/exclusion search for a researcher, full documentation of all methods going into the search process may be necessary.

As described herein, Nested Knowledge has written methods for qualitative portions of our methods of data gathering and can auto-generate methods related to personnel, dates, search terms, data gathered, and the fields/nests for which data has been gathered. When a Q Search is completed, in the subsequent Research Table, users can download a methods document that contains all of this information, including the sources of all data and the fields covered by the search and that gives the full process of the studies/data from data gathering through to the search.

Vitally, these methods indicate the fields for which Nested Knowledge has gathered data in total (effectively, they show existing nests' fields of interest), so users can distinguish if their search returned too few results because of insufficient coverage of fields. If a user finds that the field of interest is not covered (either when they complete field limitation or when they see the methods), she can contact Nested Knowledge using the methods described below.

In an embodiment, our site will have two ways to address missing fields of research and data elements of interest to researchers. This will be especially important during the development phase of Q Search, as before we have abstracted the entire literature, our search will represent only a subset of the medical literature. If users cannot find data on our search because it is missing, they will be able to send requests to us on the site for specific search terms (data elements) or for entire fields of research. This can be completed both for a missing disease/field or for missing data (for instance, if a researcher notices that we report stroke outcomes but no studies of a given piece of data like deaths from anesthesia or rate of intracranial hemorrhage). If users would like to actively participate in or fund the abstraction of data from a given field or subfield, they will have the further option of requesting a collaboration with Nested Knowledge when entering their request for adding search terms to Q Search.

In an embodiment, the present innovation is a method for measuring the quality of data reporting in a given medical study involving collecting data from all studies associated with a particular disease, categorizing all the collected data disclosed in all studies based on data elements disclosed in each study, weighting the data based on factors that are common to each study, applying a time decay function to the data, computing a central data tendency of the studies, computing a geometrical closeness to said central data tendency from the data tendency for any particular study, producing a visual representation of the geometrical closeness from a provided central tendency of any particular study, and displaying the visual representation to a user. The method so described may subject all included studies to a text search and compare the included articles against a text search of excluded articles. Words most commonly stated in the included articles compared with excluded articles may then be searched in Boolean strings. In the instant method, the best-performing studies report all data elements reported commonly in studies of the same research question and the user can request computation of particular data types. In the instant method, the visual representation pertains to a medical subfield or a disease state.

In an embodiment the instant innovation is a system for measuring the quality of data reporting in a given medical study in which a data processor is in communication with one or more medical databases, the system collecting data from all studies associated with a particular disease and categorizing all the collected data based on data elements disclosed in each study. The system uses a module to weight the data based on study commonality, to apply a time decay function to the data, to compute a central data tendency of the studies, to compute a geometrical closeness to said central data tendency from the data tendency for any particular study, and to produce a visual representation of the geometrical closeness from central tendency of any particular study. The system includes a user device capable of receiving and displaying the visual representation and in fact displays the visual representation to a user. The instant innovation includes studies that are subjected to a text search and compared against a text search of excluded articles. The system compares the words most commonly stated in the included articles with excluded articles are then those words are searched in Boolean strings. In the instant innovation, the best-performing studies report all data elements reported commonly in studies of the same research question. In addition, the user of the instant system can request computation of particular data types. The visual representation of the instant innovation pertains to a medical subfield or a disease state.

Turning now to FIG. 1, a process flow diagram consistent with certain embodiments of the present invention is shown. At 100, the process begins. At 102, a team of scientific experts from a given medical subfield use existing survey methods to identify research questions of interest. At 104, studies of medical research platforms are culled for all relevant studies pertaining to the research questions of interest. At 106, study data is extracted through automated software and through human examination of the first five articles accessed through an institutional subscription. Data is gathered and subjected to third party adjudication, then analyzed with proprietary software at 108. At 110, Nests are designed to strike a balance between existing visuals and custom features. At 112, a calculated "Harmonization Factor" or "Q Factor" is applied to qualify the studies analyzed. At 114, the resulting analytical dataset is displayed in a variety of visual formats. At 116, the process ends.

Figure 2:
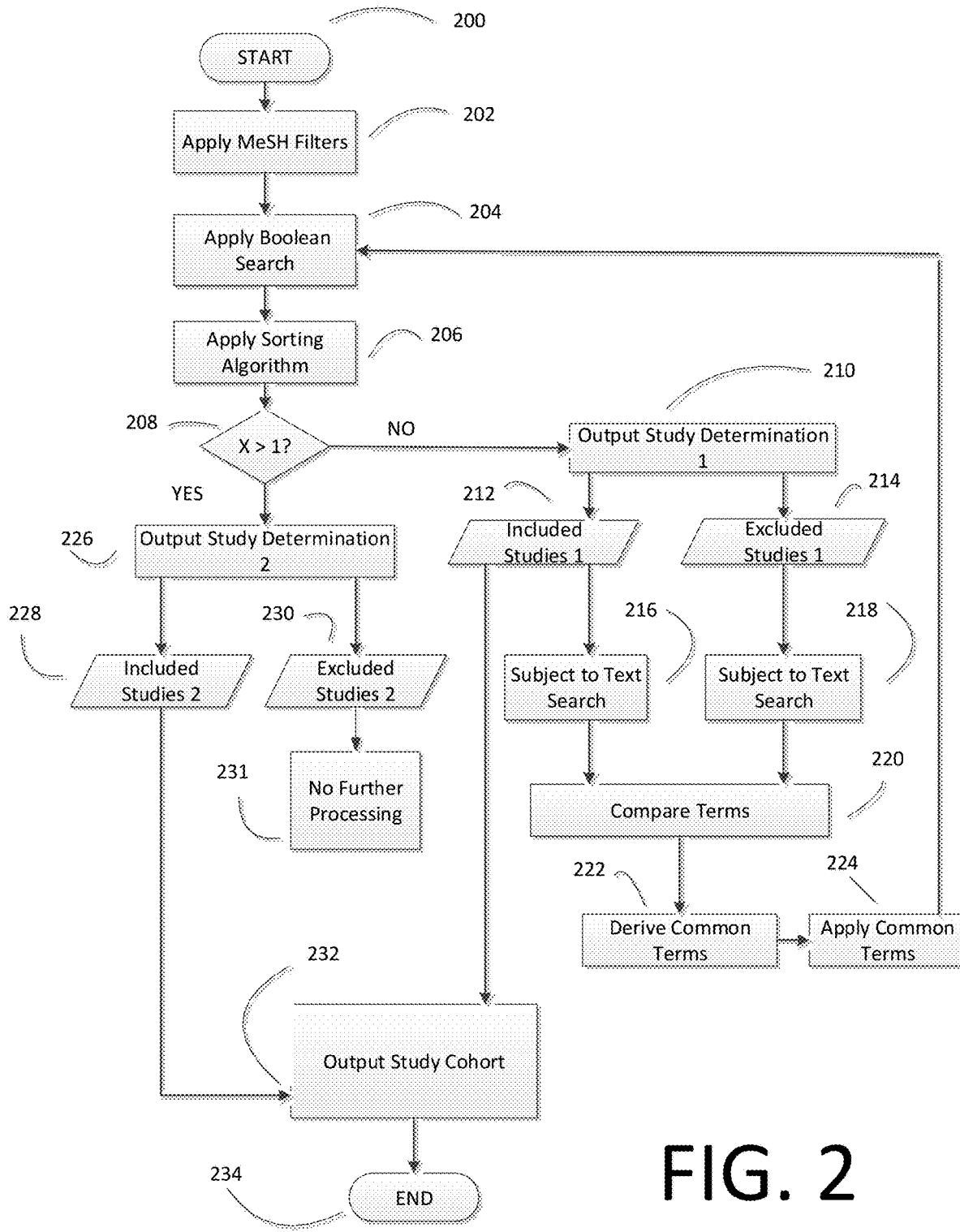
FIG. 2 is a process flow diagram of the study selection sub-process consistent with certain embodiments of the present invention.

Turning now to FIG. 2, a process flow diagram of the study selection sub-process consistent with certain embodiments of the present invention is shown. At 200, the sub-process begins. At 202, NLM assigned "MeSH" filters that match a disease state, treatment, or outcome are applied to the text of a given study. At 204, Boolean search terms combining all known iterations in spelling or phrasing related to the disease state are combined with those terms of the treatment of interest, analyzing each study with known iterations of each term. At 206, the sorting algorithm is applied to each study using the combination of search terms. At 208, if sub-process iteration is less than one, Output Study Determination 1 is made at 210. The Output Study Determination 1 210 is composed of Included Studies 1 at 212 and Excluded Studies 1 at 214. Included Studies 1 and Excluded Studies 1 are each subjected to Text Search at 216 and 218, respectively. A comparison of the terms resulting from Text Search 216 and Text Search 218 is made at 220. At 222, terms common to Included Studies 1 and Excluded Studies 1 are derived and applied at 224 to the Boolean Search of the study data 204, whereupon search results are subjected to the Sorting Algorithm at 206. If at 208 the sub-process iteration is greater than one, Output Study Determination 2 is made at 226. Output Study Determination 2 is composed of Included Studies 2 at 228 and Excluded Studies 2 at 230. No Further Processing 231 is applied to Excluded Studies 2. Included Studies 1, 212 and Included Studies 2, 228 are output as the study cohort at 232. At 234, the sub-process ends.

Figure 3A:
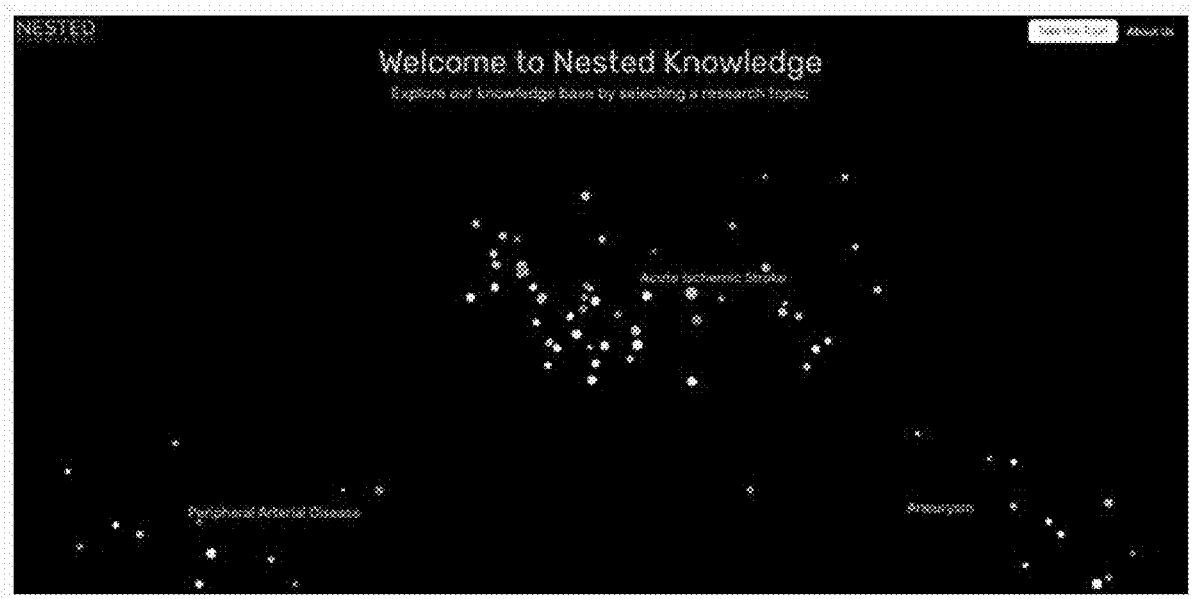
FIG. 3A is a first visual representation of a user experience consistent with certain embodiments of the present invention.

Turning now to FIG. 3A, a first visual representation of a user experience consistent with certain embodiments of the present invention is shown. The landing page 300 provides a visualization of centroid clustering of studies based on the data they include. In an embodiment, each study's node is a different size based on the size of the patient population, and upon scroll-over of a given nest's studies a box appears showing which studies were included in that nest.

Figure 3B:
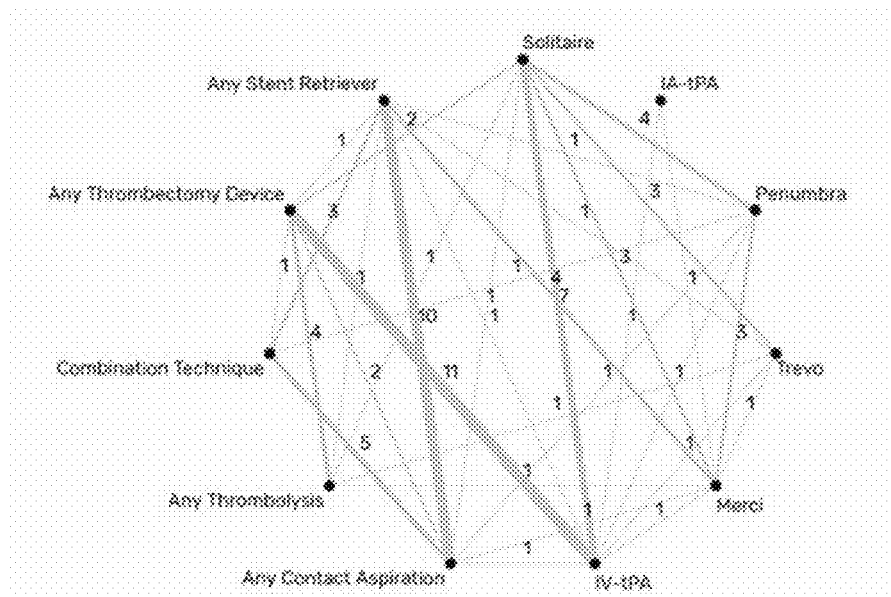
FIG. 3B is a second visual representation of a user experience consistent with certain embodiments of the present invention.

Tuning now to FIG. 3B, a second visual representation of a user experience consistent with certain embodiments of the present invention is shown. The Nest Hub at 302 shows nodes each of which represent a therapy of interest, with the lines between each node representing a range of various data. The visual design permits the display of scroll-over values and explanations, editable inclusion of studies in a selection-based legend, and links through to underlying data.

Figure 4:
FIG. 4 is a third visual representation of a user experience consistent with certain embodiments of the present invention.

Turning now to FIG. 4, a third visual representation of a user experience consistent with certain embodiments of the present invention is shown. Selection Legend at 400 describes a specific Nest page's presentation, statistics, and data elements. In an embodiment, the Selection Legend 400 is capable of being edited by users.

Figure 5:
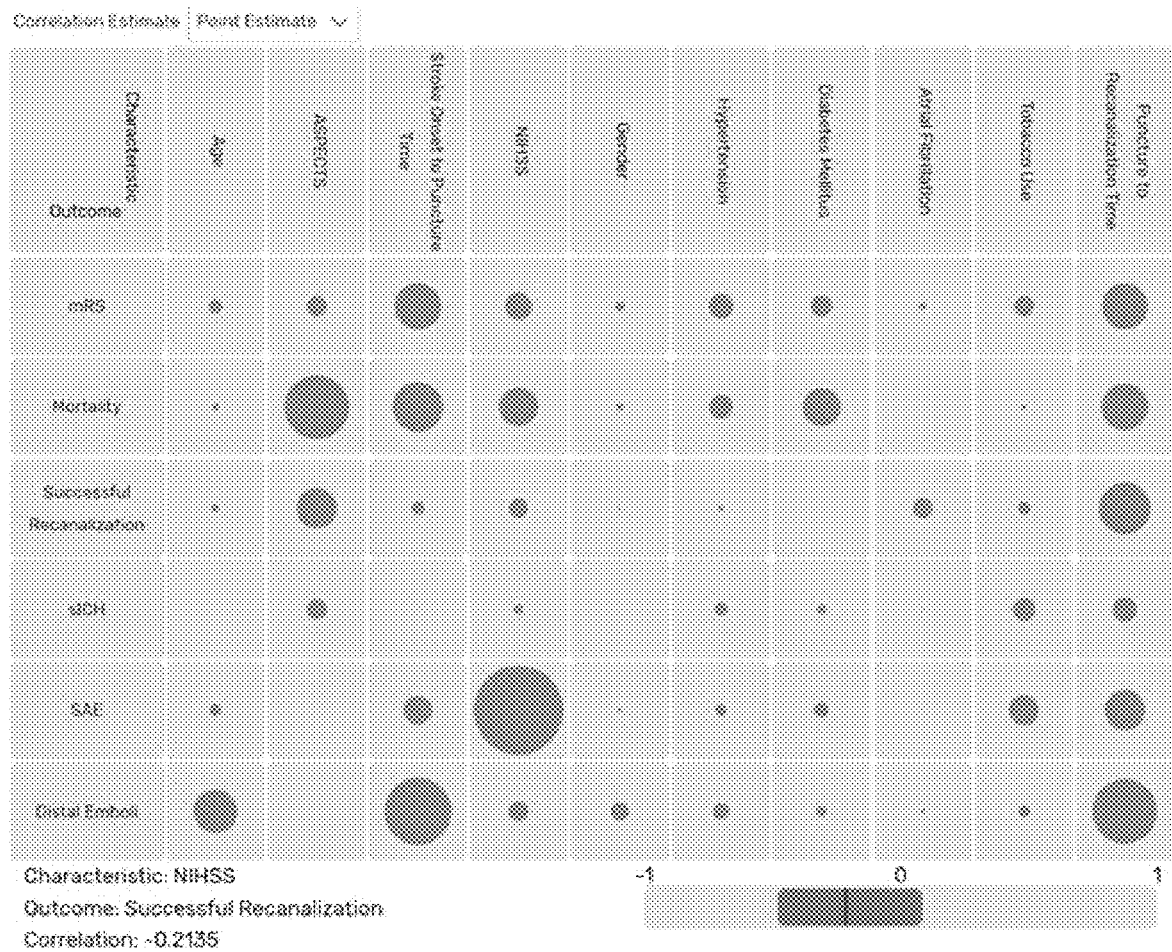
FIG. 5 is a fourth visual representation of a user experience consistent with certain embodiments of the present invention.

Turning now to FIG. 5, a fourth visual representation of a user experience consistent with certain embodiments of the present invention is shown. Correlation Matrix 500 permits comparison of one set of values, such as, in a non-limiting example, patient background characteristics, in columns, to another set of values such as, in a non-limiting example, patient outcomes, in rows. In an embodiment, each cell may contain either a numerical value, a colored circle of varying diameter, or both.

Figure 6A:
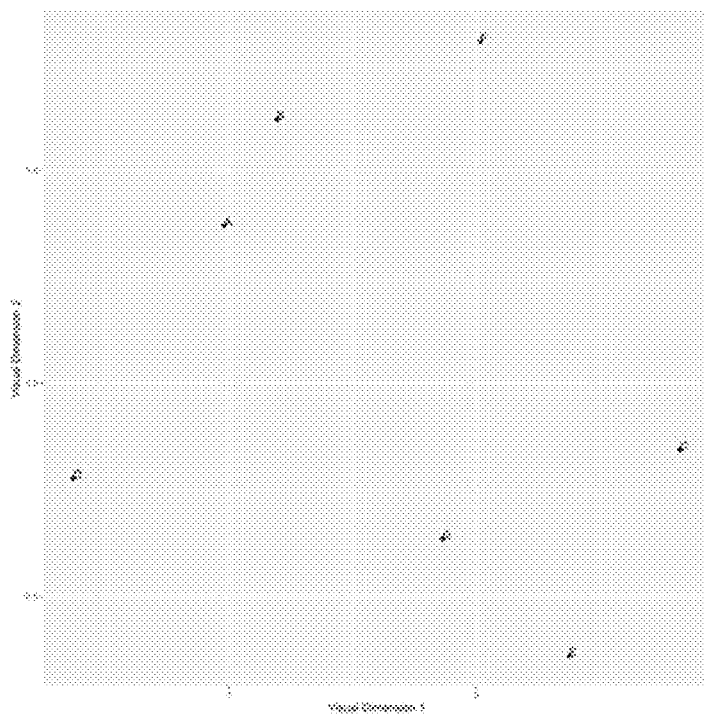
FIG. 6A is a fifth visual representation of a user experience consistent with certain embodiments of the present invention.

Turning now to FIG. 6A, a fifth visual representation of a user experience consistent with certain embodiments of the present invention is shown. Dimensionally reduced 2D view 600 displays synthesized data, with each study appearing as a point.

Figure 6B:
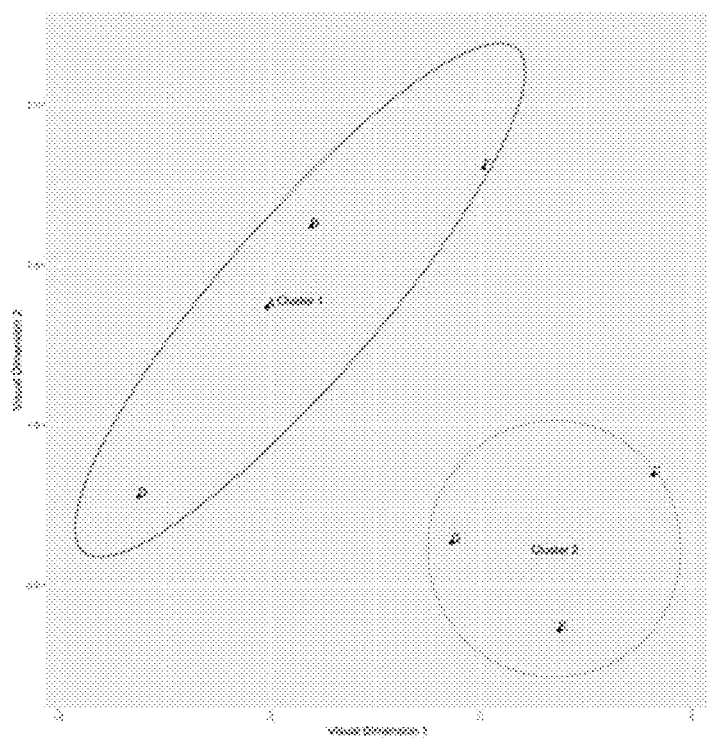
FIG. 6B is a sixth visual representation of a user experience consistent with certain embodiments of the present invention.

Turning now to FIG. 6B, a sixth visual representation of a user experience consistent with certain embodiments of the present invention is shown. Dimensionally reduced 2D view 602 displays automated clustering of studies. Clustering enables more complex differentiation to be noted even when dozens of variables across hundreds of studies are being compared.

Turning now to FIG. 7A, a seventh visual representation of a user experience consistent with certain embodiments of the present invention is shown. Dimensionally reduced 2D view 700 displays the centroid, or mean, of a given cluster, and provides a visual representation of how closely studies adhere to the average of related studies.

Turning now to FIG. 7B, an eighth visual representation of a user experience consistent with certain embodiments of the present invention is shown. Dimensionally reduced 2D view 702 displays a computed distance from a central tendency, with the final computed Q Factor being inverse in magnitude to the straight line distance from each point to the centroid. In the reduced 2D views, the smaller the computed distance from central tendency, the better any particular study reported data. In an embodiment, the computed distance represents a calculated Q Factor. In short, the distance from the center of the centroid is equal to the Q Factor. In an embodiment it is presented visually such that users can see which "failures of reporting" different studies presented.

In an embodiment, the central tendency is part of Q Factor scoring/ranking, which is presented as a number to users, and who can also examine the 2D view and scroll over said view to see whether, in a non-limiting example, a study is deficient in "mortality reporting," which is one of the 17 dimensions currently reduced in the 2D view. Any given "direction" in the 2D view is based on the relationship between failures to report (so, if studies that did not report mortality also tended not to report intracranial hemorrhage, those "directions" would be next to each other and studies with those failures would be close to those axes).

In an embodiment, the visual representation of Q Factor enables users to see trends in reporting failures (so if many studies failed to report mortality and intracranial hemorrhage, their visual placement would show that even though this is not readily visible by just looking at the Q Factor scores). In a non-limiting example, users may notice these trends and point them out to the research community, or may use the visual to decide for themselves what reporting failures matter the most and which studies failed with regard to those outcomes of interest.

Figures 8A, 8B:
FIG. 8A is a ninth visual representation of a user experience consistent with certain embodiments of the present invention.
FIG. 8B is a tenth visual representation of a user experience consistent with certain embodiments of the present invention.

Turning now to FIG. 8A, a ninth visual representation of a user experience consistent with certain embodiments of the present invention is shown. At 802 is a screenshot of the "Literature Search" step in our application. In this step, a user enters the search terms of interest, generates synonyms, and then runs the search. The system records the searcher's ID, the date, and enables the user to choose a schedule on which the search is repeated. Boolean search terms combining all known iterations in spelling or phrasing related to the disease state are combined with those of the treatment of interest, limiting unrelated results but covering any study using known iterations of each term. Subsidiary terms such as common patient presentations and specific devices are then searched in combination with the disease state or treatment to maximize coverage.

Turning now to FIG. 8B, a tenth visual representation of a user experience consistent with certain embodiments of the present invention is shown. At 804 is a screenshot of the "Inclusion/Exclusion" step, in which the user configures our algorithm to include or exclude studies based on date of publication, language, the presence or absence of MeSH terms, Title and Abstract text filters, or customized reasons. These reasons are then applied to studies in an automated manner-excluding all studies that fail to meet the criteria configured by the user. Subsequently, the user manually reviews all studies that meet the automated criteria and makes a final decision on including or excluding each study. The algorithm completes automated exclusion of studies unlikely to be related to our research question of interest.

Figures 9A, 9B:
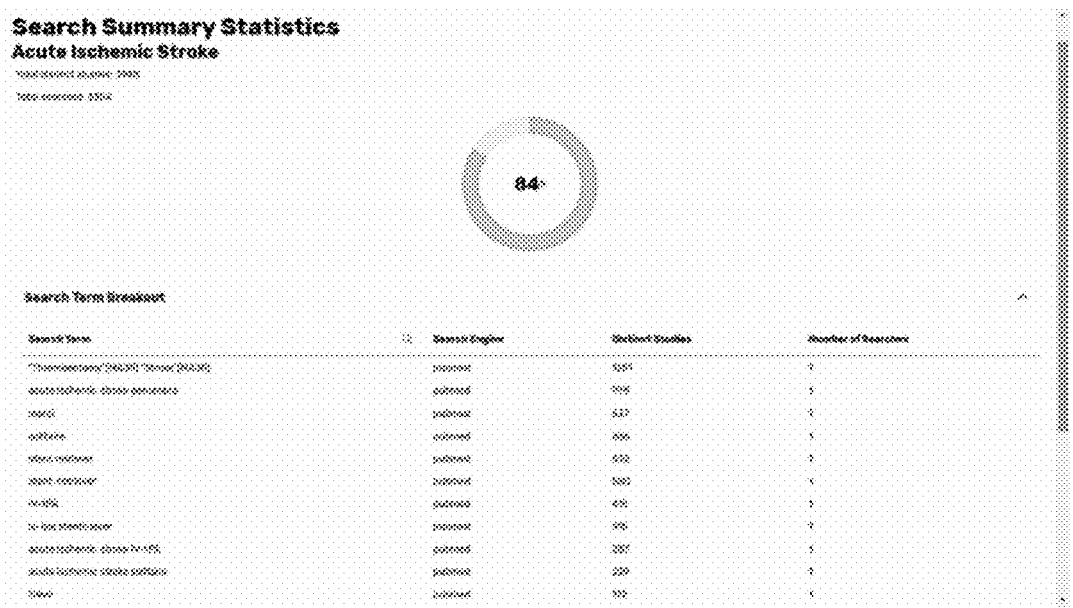
FIG. 9A is an eleventh visual representation of a user experience consistent with certain embodiments of the present invention.
FIG. 9B is a twelfth visual representation of a user experience consistent with certain embodiments of the present invention.

Turning now to FIG. 9A, an eleventh visual representation of a user experience consistent with certain embodiments of the present invention is shown. At 902 is a screenshot of the "Manual Exclusion" step, during which two independent reviewers are prompted to view the titles and abstracts of all studies not auto-excluded, and decide whether to include them. If the reviewer excludes the study, she also notes the reason for excluding. These two independent reviewers' decisions are automatically compared against each other, and a third party reviews and adjudicates any disagreement. Once automated exclusion is completed, the algorithm sends a .CSV of the metadata of the study to our proprietary data-gathering site, and prompts the two separate, trained researchers to review the list of studies that were not yet excluded by the automated system.

Turning now to FIG. 9B, a twelfth visual representation of a user experience consistent with certain embodiments of the present invention is shown. At 904 is a screenshot of our "Inclusion Report," which contains a range of basic analytics concerning numbers of studies included, excluded, and duplicated. This page enables PRISMA-compliant charts to be created for regulatory and scientific literature reviews, as well as analysis of inclusion rates and coverage of any given search. the proprietary software generates a full report of the inclusion and exclusion process, including all visuals outlined above, and then prompts the researchers to begin the data extraction phase. Once the final list of included studies is established and two researchers have been prompted for data gathering from each study, these two separate researchers gather the data from each study in an inter-observer variability quality-control manner.

Figure 10A:
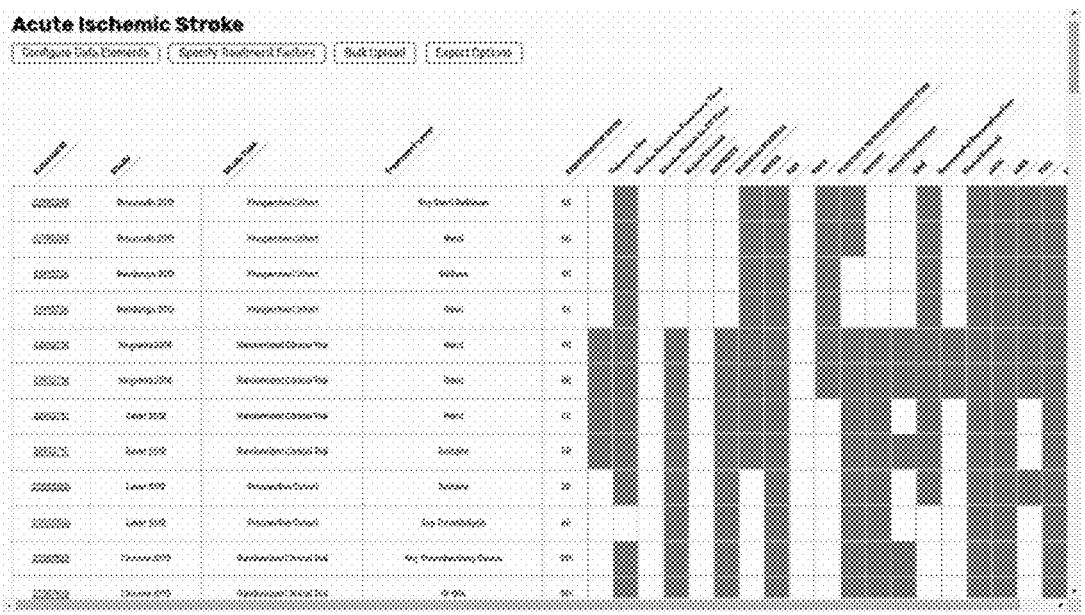
FIG. 10A is a thirteenth visual representation of a user experience consistent with certain embodiments of the present invention.

Turning now to FIG. 10A, a thirteenth visual representation of a user experience consistent with certain embodiments of the present invention is shown. At 1002 is a screenshot of the "Data Gathering" page, where users can configure data elements, classify studies by the hierarchy of evidence, complete bias analyses, and gather data. The study metadata is auto-generated into the table, after which the user defines treatment arms, and then gathers all data and completes all hierarchy of evidence assessments. This process is repeated by two gatherers, and then their data gathering results are compared by a third party adjudicator as quality control. The process is as follows:

1) Each study's metadata are populated automatically by the proprietary software from Medline, but each researcher combs through the first five PDFs of the articles accessed through an institutional subscription and creates a table of all data elements reported in those five articles. Along with the third party adjudicator, the researchers compare their data elements gathered and finalize the first table of data elements.

2) Once the table's data elements have been established, the two gatherers collect each data element from all included studies in parallel. Any data elements that appear after the first table is finalized are added separately by each researcher and accorded at the end of the gathering cycle.

Vitally, if the study is multi-arm (that is, there are distinct populations for which data are reported separately), the study is marked as multi-arm and each arm's data are gathered separately. Each researcher also reports the units used in each instance, and each differential unit type (mean vs. median, for instance), are reported as separate data elements.

Once both researchers have gathered data from all studies, the proprietary software automatically adjudicates and determines which data points "match" between reviewers and that therefore are likely representative of the underlying study. All data points that do not match are sent to the third party adjudicator, who reads each study and determines what the final value is for each of the conflicting data points. Furthermore, the proprietary software flags statistical anomalies from any category for confirmation by the third party reviewer that these anomalies are indeed the reported values. Anomalies are determined based on variance from the mean values for each data element; values outside of the 95% confidence interval for any data element are considered anomalous.

Statistical Power: Statistical power is retrospectively analyzed for each study using standard binomial and mean difference power tests. Study population size is drawn directly from the source study. Effect size & variance estimates are drawn from an aggregate network meta-analysis model, dependent on the treatment arms of the study. Significance levels are parameterized at the field of study convention (typically 0.05). For studies with more than 2 arms, the relevant hypothesis test & test statistic are analyzed, if stated in the study, else, all pairs of arms are contrasted and weighted average (using study arm size) power is computed.

Our reviewers then analyze the risk of bias based on the following existing analytical frameworks:

If the study is a randomized trial, the Randomized Trial Risk of Bias 2 test.

If the study is not a randomized trial, the ROBINS-I test.

These risk of bias reports are completed by both reviewers independently and adjudicated by the third party adjudicator.

Once third party adjudication of all data elements and metrics (Hierarchy of Evidence, risk of bias) are completed, they are fed back into our proprietary software. However, as methods & format of data reporting within fields can vary widely & the software requires homogeneous data structure, the data must be generalized first.

Data relevant to studies are generalized by the addition of:
An assimilation of the treatment to a hierarchy If a study arm uses one of many possible therapies as treatment, the lowest common parent in the hierarchy is selected as the study arm treatment If a study arm treatment consists of several therapies, they are all maintained, but a "major" treatment is specified Date of collection (in case of amendments)

Publication metadata, obtained from online databases:

Journal, volume, issue, and pages

Keywords

Number of citations, to date

Author affiliations

Furthermore, each data element is tagged or associated with:

Classification of measurement

Patient background characteristic

Patient outcome

Treatment method (e.g. magnitude of dosage).

Unit of measurement.

Type of data:

Categorical, ordinal, continuous

For categorical:

As applicable, how the data element can be dichotomized (e.g. gender data elements could be dichotomized "% Female")

As applicable, how categories have combined (e.g. count of patients with "blue or green" eyes versus separate counts)

For summary data, the type of statistic (e.g. mean, median, count).

Directionality annotations e.g. lower recurrence rate of stroke is a positive outcome e.g. lower neurologic functioning post-stroke is a negative outcome In an embodiment, the data schema used by the software represents an abstraction of the concepts & objects underlying research in clinical medicine. The abstraction provides generality to otherwise heterogeneous data sets, allowing software applications to consume data sets across research questions in a singular and consistent manner.

In a non-limiting example, each box of a representative data schema represents a table (a container for data), with the table name as the first row, and a shortened listing of data attributes (qualities of each object in the table) as the remaining rows. Arrows represent a "has a" relationship, e.g. a "study" has one or more "study_arm" objects. The instant innovation displays a variety of statistics, including odds ratios, correlation coefficients, power, and associated inferential statistics (p-values and confidence intervals). These statistics are derived from study summary data on every user web request.

Figure 10B:
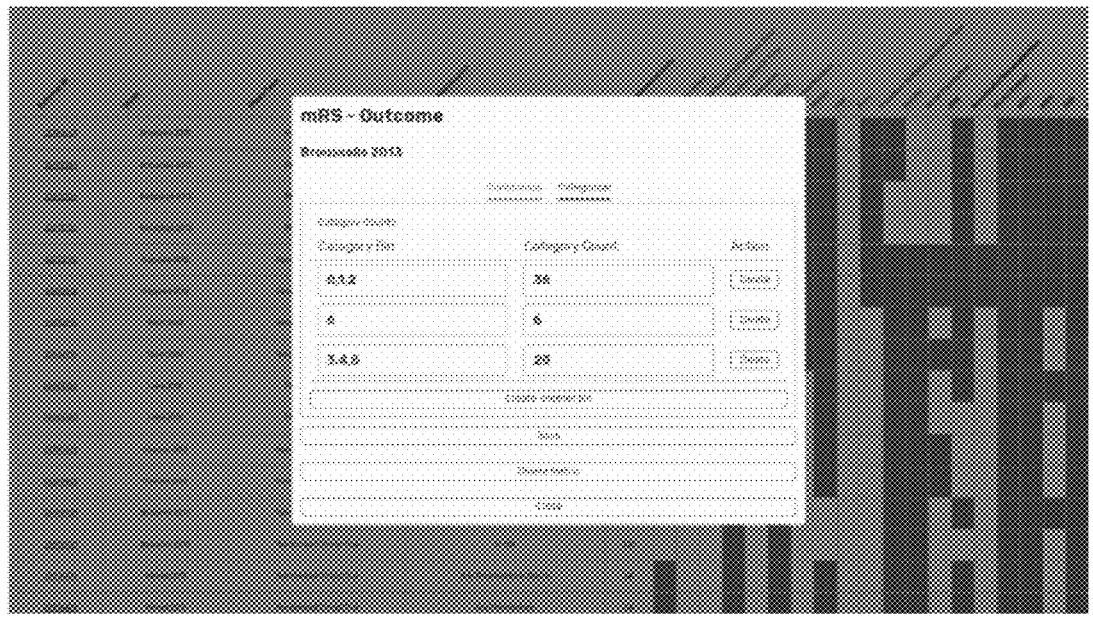
FIG. 10B is a fourteenth visual representation of a user experience consistent with certain embodiments of the present invention.

Turning now to FIG. 10B, a fourteenth visual representation of a user experience consistent with certain embodiments of the present invention is shown. At 1004 is a screenshot of the form that appears on the "Data Gathering" page for any given data element. The user can configure and tag the data element (what type of statistic it is, how its information is "binned," and whether it is a background characteristic, treatment, or outcome). Along with a third party adjudicator, the researchers in an embodiment compare their data elements gathered and finalize the first table of data elements.

Figures 11A, 11B:
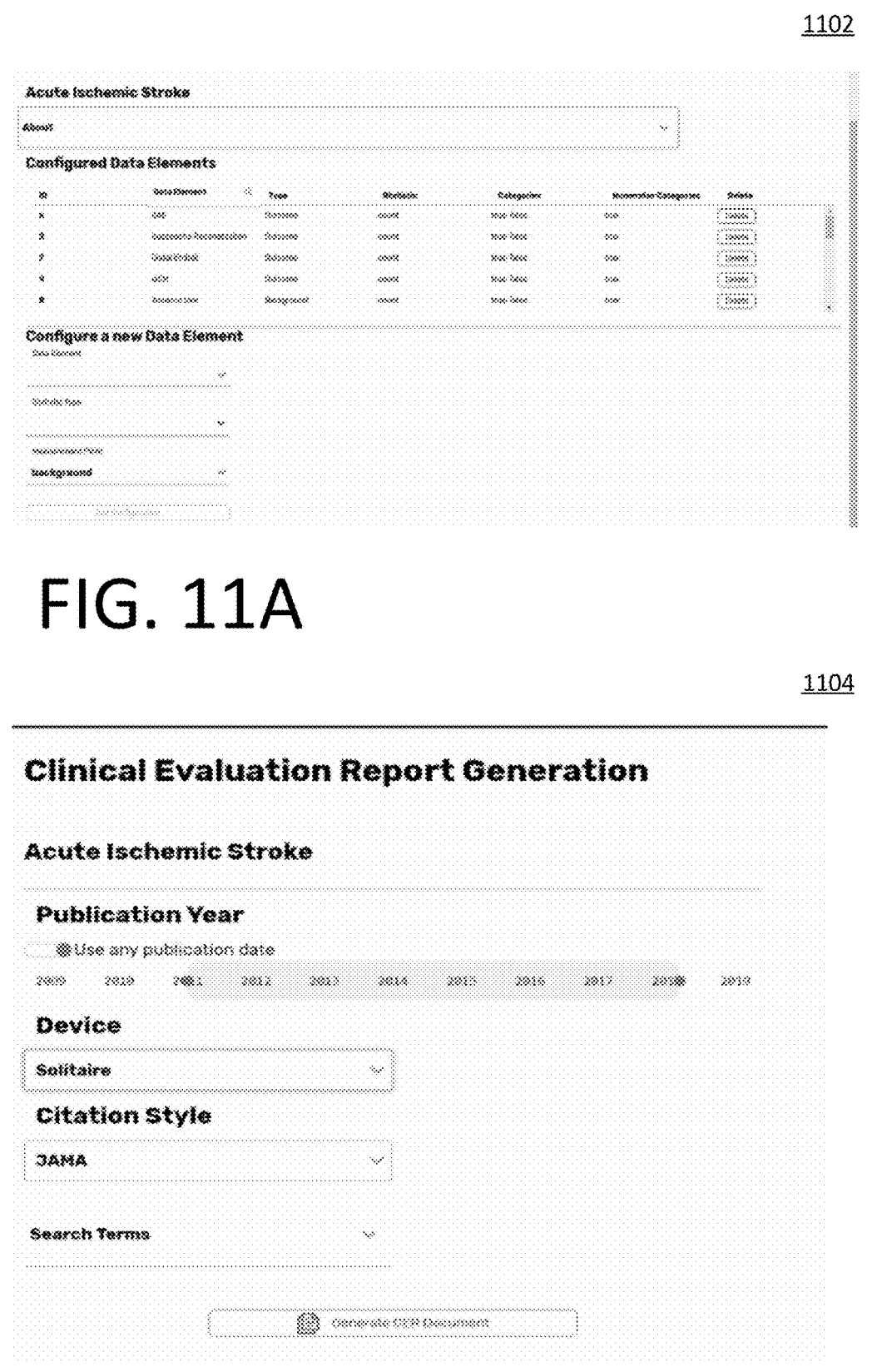

Turning now to FIG. 11A, a fifteenth visual representation of a user experience consistent with certain embodiments of the present invention is shown. At 1102 is a screenshot of the data element configuration page that users are directed to for all data element characterization. These data elements (and their tags) are then populated into the data gathering table, and saved so that future users can reuse the same data elements if they are applicable to future nests. Each data element is shown tagged or associated with:
  Classification of measurement
  Patient background characteristic
  Patient outcome
  Treatment method (e.g. magnitude of dosage).
  Unit of measurement.
  Type of data:
  Categorical, ordinal, continuous
  For categorical:
  As applicable, how the data element can be dichotomized (e.g. gender data elements could be dichotomized "% Female")
  As applicable, how categories have combined (e.g. count of patients with "blue or green" eyes versus separate counts)
  For summary data, the type of statistic (e.g. mean, median, count)
  Directionality annotations
  e.g. lower recurrence rate of stroke is a positive outcome
  e.g. lower neurologic functioning post-stroke is a negative outcome Turning now to FIG. 11B, a sixteenth visual representation of a user experience consistent with certain embodiments of the present invention is shown. At 1104 is a screenshot of the methods- and results-generation screen, through which users can configure a downloadable Word document that describes what Nest of interest they are drawing research from, the methods used to gather that data, a PRISMA chart, all relevant patient outcome data, and an appendix detailing the full search, inclusion, exclusion, and data gathering process. The instant innovation can auto-generate methods related to personnel, dates, search terms, data gathered, and the fields/nests for which data has been gathered. When a Q Search is completed, in the subsequent Research Table, users can download a methods document that contains all of this information, including the sources of all data and the fields covered by the search and that gives the full process of the studies/data from data gathering through to the search.

Figure 12:
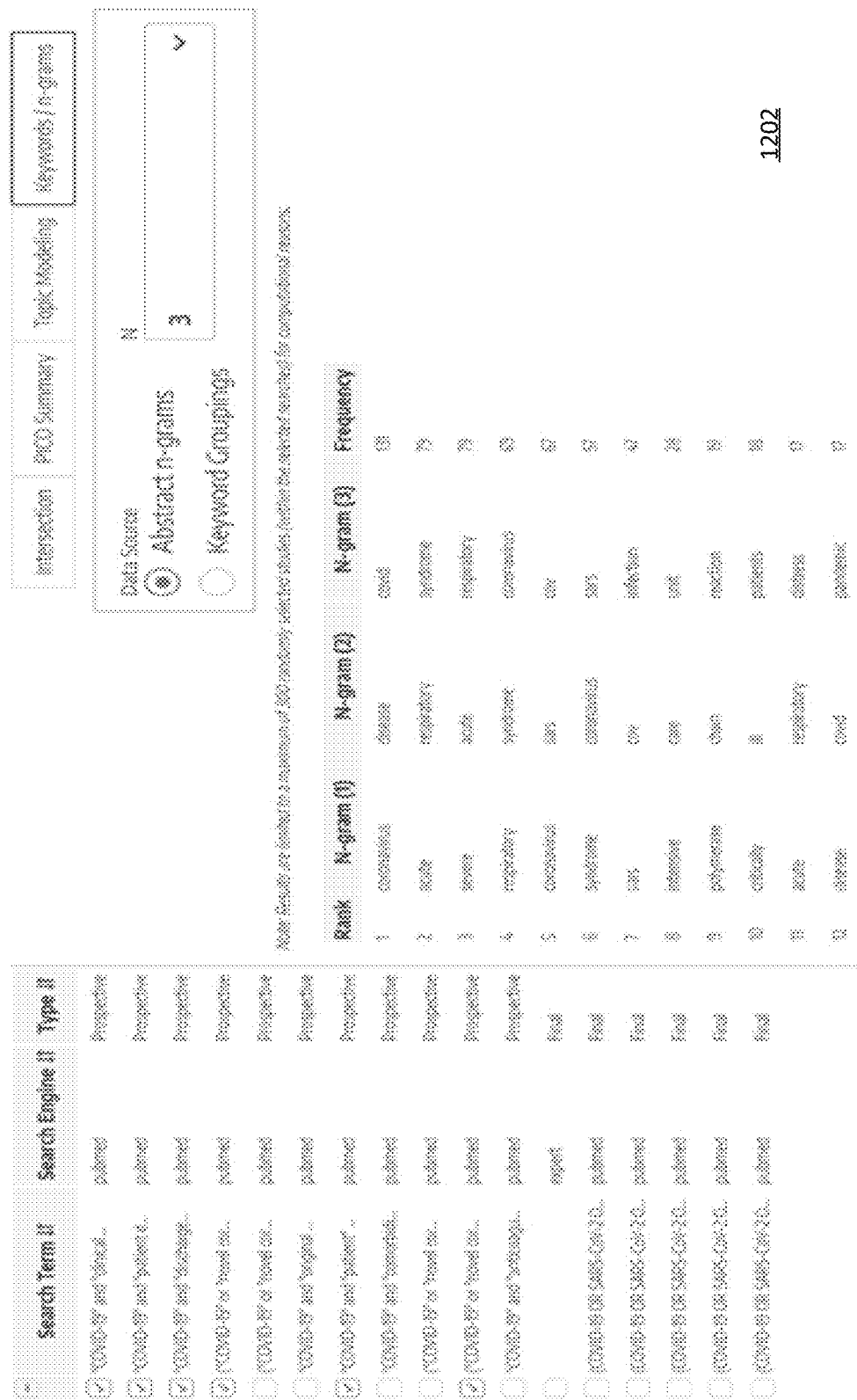
FIG. 12 is a seventeenth visual representation of a user experience consistent with certain embodiments of the present invention.

Turning now to FIG. 12, a seventeenth visual representation of a user experience consistent with certain embodiments of the present invention is shown. At 1202 is a screenshot of an N-gram summary displayed to a user, showing (on the left) the user-selection menu, enabling the user to choose which search strings will be used to create N-grams from the abstracts of studies returned from a given search. On the left, a 3-gram is shown, meaning that three-word strings are extracted, down-sampled, and presented to the user in order of frequency across studies' abstracts.

Figure 13:
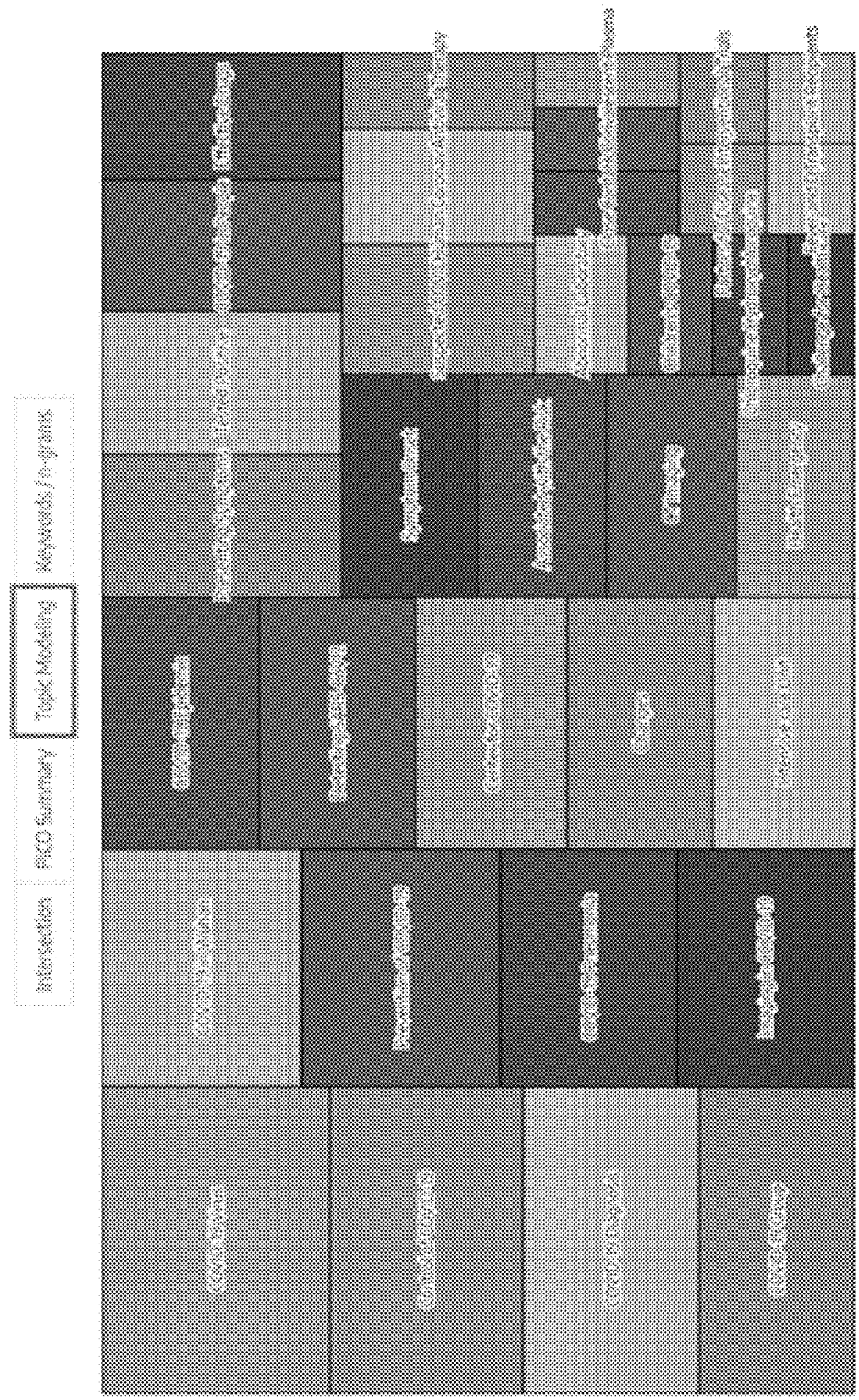
FIG. 13 is an eighteenth visual representation of a user experience consistent with certain embodiments of the present invention.

Turning now to FIG. 13, an eighteenth visual representation of a user experience consistent with certain embodiments of the present invention is shown. At 1302 is a screenshot of a Topic Model for a COVID-19-focused search. Topics are displayed with text-strings based on clustering of abstract content; size of Topic boxes is reflective of the number of studies with a string related to that Topic. To see the studies that are related to a given Topic, the user selects the rectangle (show in FIG. 14).

Figure 14:
FIG. 14 is a nineteenth visual representation of a user experience consistent with certain embodiments of the present invention.

Turning now to FIG. 14, a nineteenth visual representation of a user experience consistent with certain embodiments of the present invention is shown. At 1402 is a screenshot of the Topic Model from FIG. 13, wherein a user has selected one of the Topics. Upon selection, a table is shown of all studies with content related to that Topic, with a link out to the online text of the studies. From this page, users can complete 'bulk relevancy' screening, marking entire Topics—or individual studies—as relevant or excluded.

Figure 15:
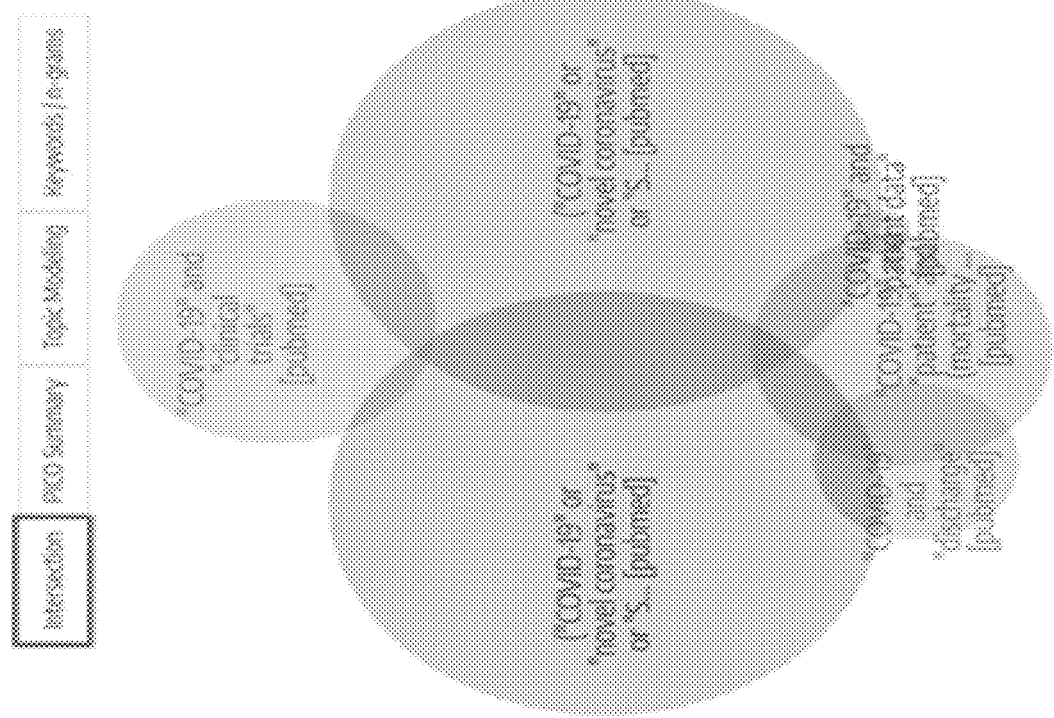
FIG. 15 is a twentieth visual representation of a user experience consistent with certain embodiments of the present invention.

Turning now to FIG. 15, a twentieth visual representation of a user experience consistent with certain embodiments of the present invention is shown. At 1502 is a screenshot of the Venn Clustering of terms, a two-dimensional model of multivariate relationships. The overlap between candidate search terms (representing number of 'shared' results) is visually presented to the user to ensure full coverage of concepts of interest. We use 'least squares' optimization on the set of second- and third-degree intersections between search terms to fit a two-dimensional Venn diagram representing the overlap in candidate search term results.

Turning now to FIG. 16, a twenty-first visual representation of a user experience consistent with certain embodiments of the present invention is shown. At 1602 is a screenshot of the Search Builder interface, where users add candidate search strings and Standard Hedges to the builder, are shown the number of results and unique results, and then an Inclusion Prediction score. From this page, the user can add strings, evaluate them, and then finalize the search.

Figure 17:
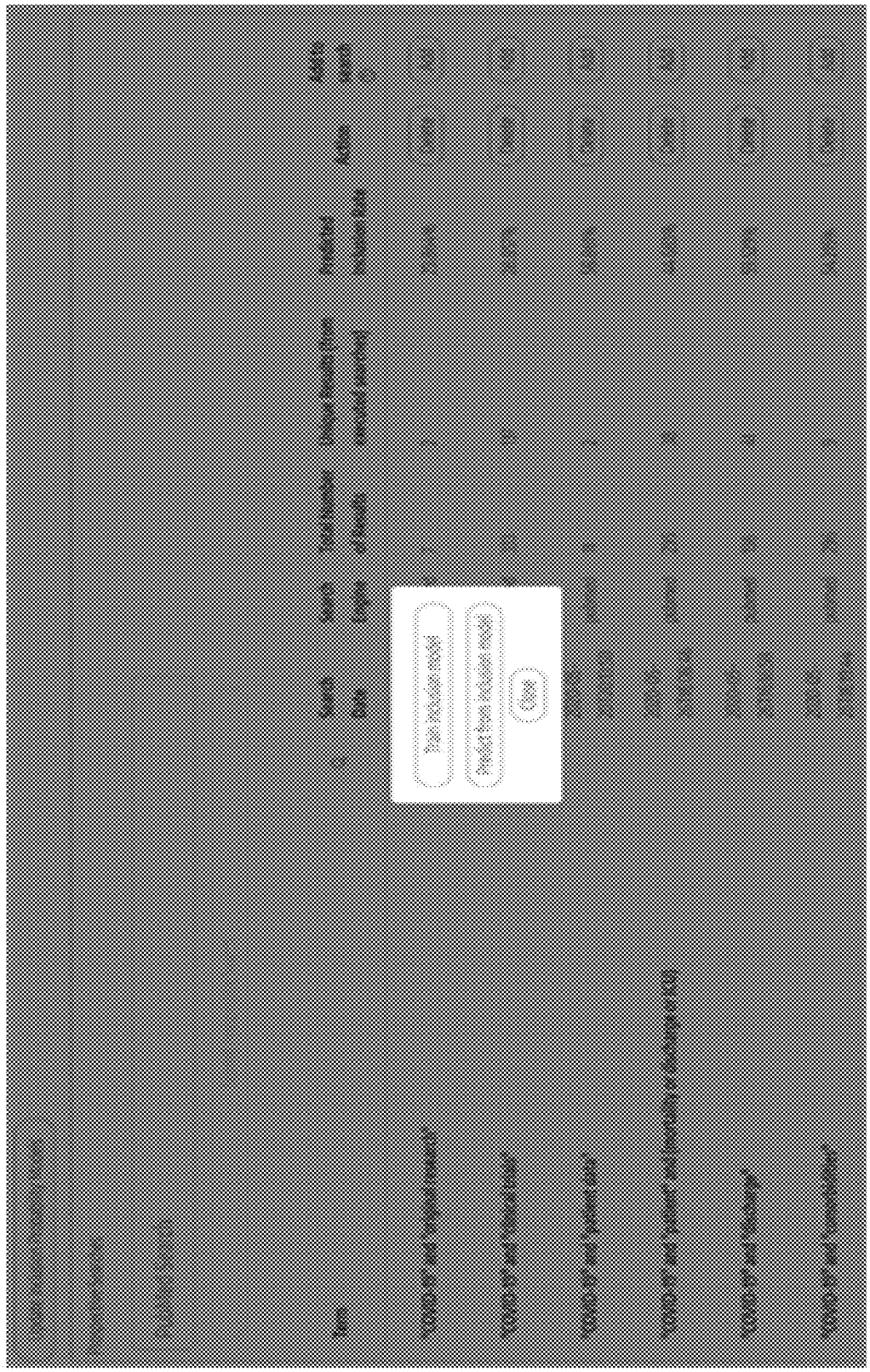
FIG. 17 is a twenty-second visual representation of a user experience consistent with certain embodiments of the present invention.

Turning now to FIG. 17, a twenty-second visual representation of a user experience consistent with certain embodiments of the present invention is shown. At 1702 is a screenshot of the Inclusion Prediction page with a modal open that allows the user to train and update the prediction model once pre-screening is complete.

Figure 18:
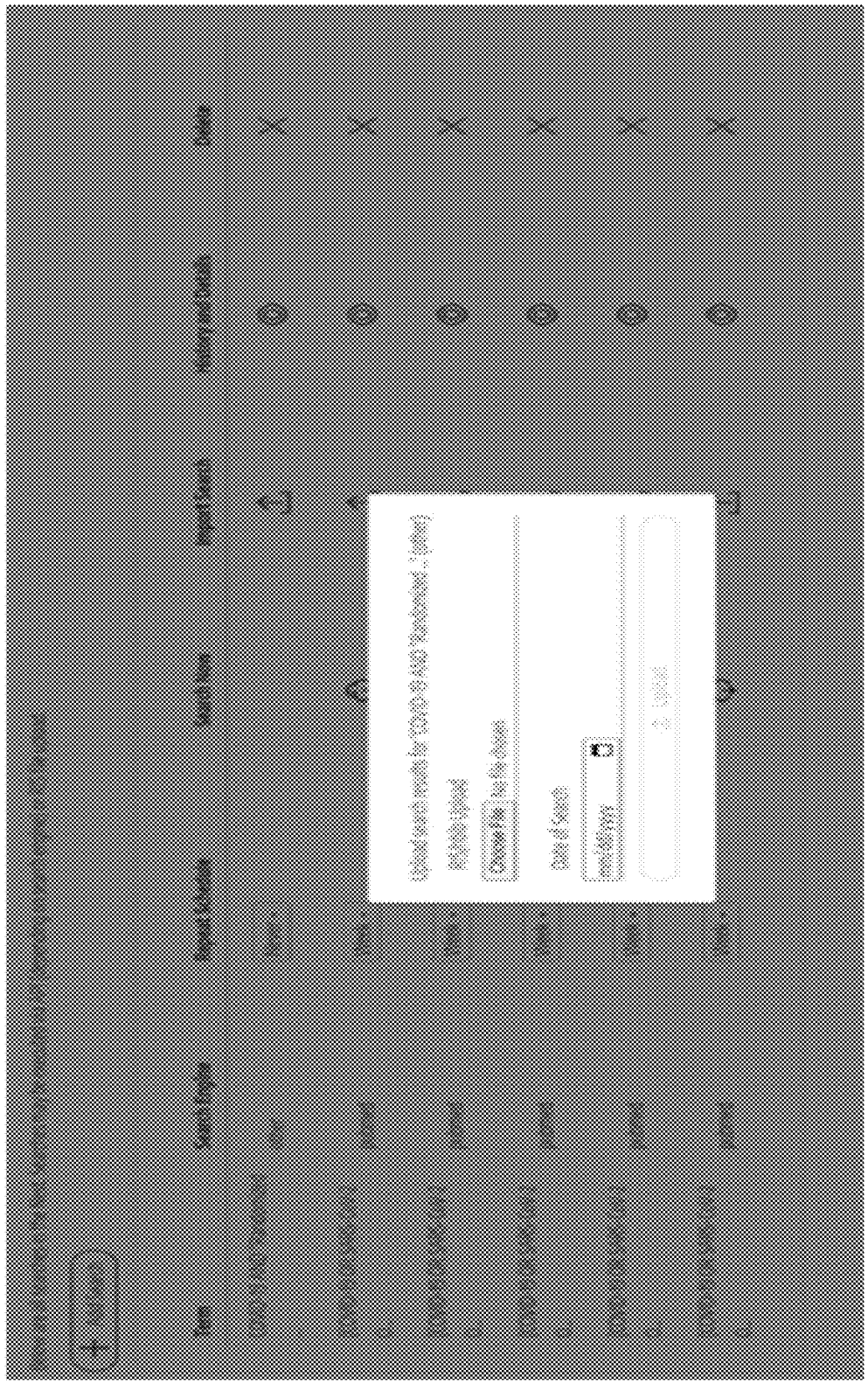
FIG. 18 is a twenty-third visual representation of a user experience consistent with certain embodiments of the present invention.

Turning now to FIG. 18, a twenty-third visual representation of a user experience consistent with certain embodiments of the present invention is shown. At 1802 is a screenshot of the RIS/nBIB import feature, wherein a user may create a search record that is not run by API, but rather uses the study metadata uploaded by the user in RIS or nBIB format. The studies uploaded in this manner are then screened alongside the studies found via API search.

Figure 19:
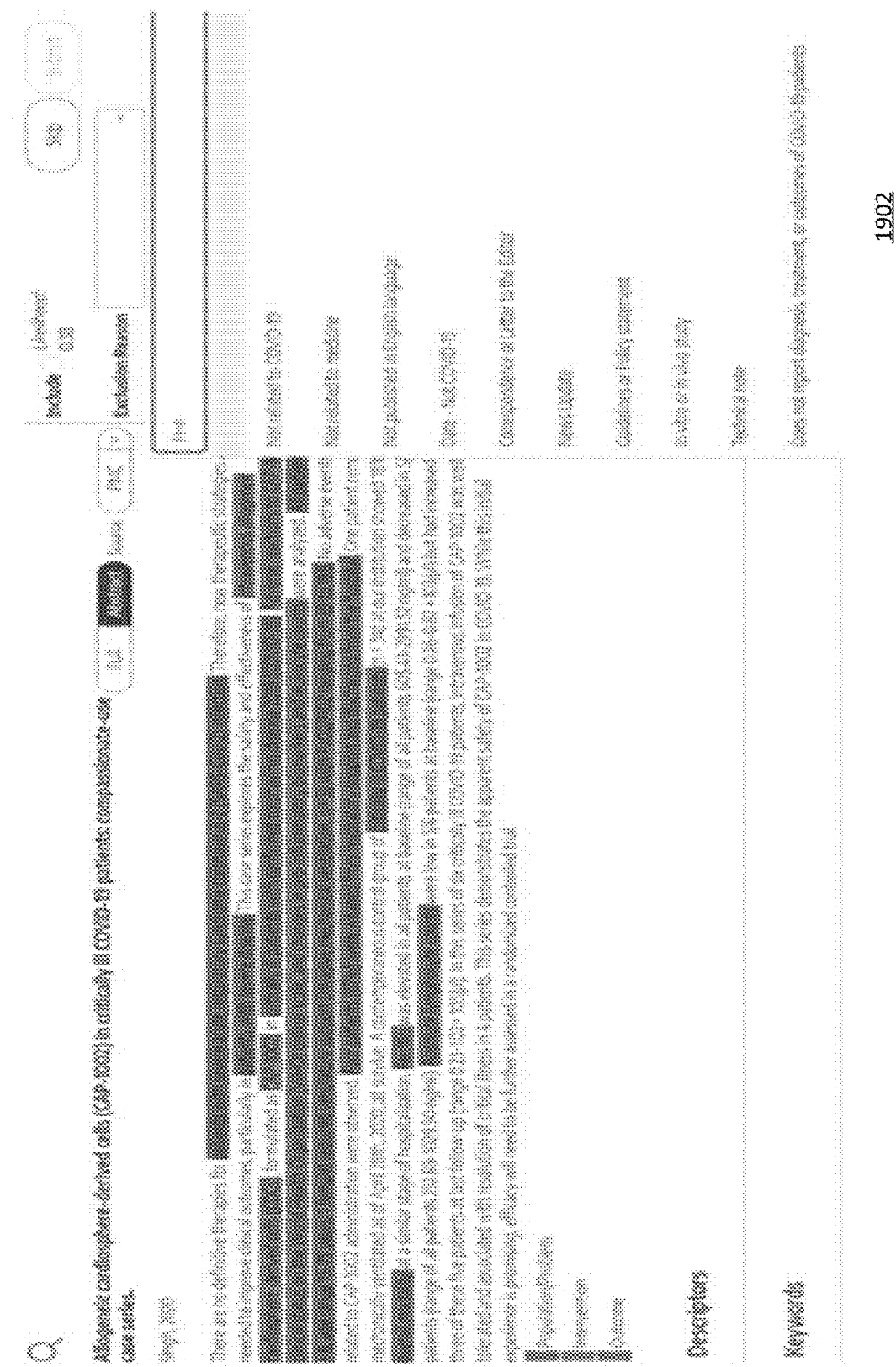
FIG. 19 is a twenty-fourth visual representation of a user experience consistent with certain embodiments of the present invention.

Turning now to FIG. 19, a twenty-fourth visual representation of a user experience consistent with certain embodiments of the present invention is shown. At 1902 is a screenshot of the Sequential Screening page, wherein a user is presented with the title, author, link to the source, and abstract of a study that resulted from a search. The user can choose to include, exclude, or skip; if the user excludes, she must select a specific user-configured Exclusion Reason (e.g. "Not published in English language"). If the relevant Exclusion Reason has not been previously configured, the user may configure it by typing it into the 'Find' box and then selecting 'Add' to make a new Exclusion reason. If the user includes the article, she will be prompted to upload a full-text PDF of the article before moving to the next article in the queue. If the user skips, the study will be queued for the next user by our queuing algorithm.

Figure 20:
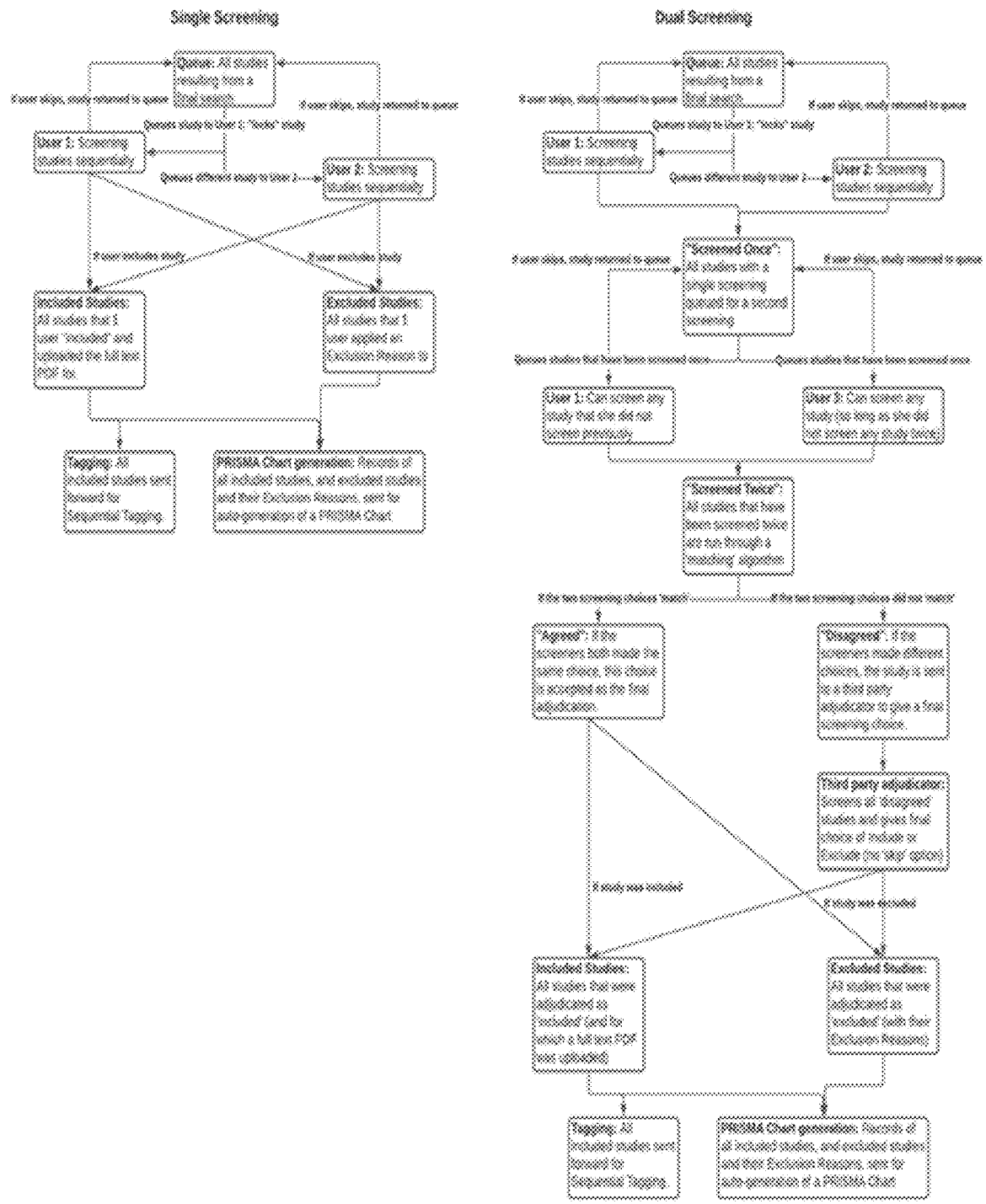
FIG. 20 is a twenty-fifth visual representation of a user experience consistent with certain embodiments of the present invention.

Turning now to FIG. 20, a twenty-fifth diagram of the actions taken by users consistent with certain embodiments of the present invention is shown. At 2002 is a screenshot of the process flows for Single Screening and Dual Screening, wherein an arbitrary number of users adjudicate whether studies will be included in or excluded from a Nest. In Single Screening, each study is screened once (by any user), with included studies sent forward for Tagging. In Dual Screening, each study is screened twice by two independent users (though any number of users may participate, each study must be screened exactly twice, and without a user screening the same study more than once). For any study about which the two screenings match, no further adjudication is needed, and included studies are sent forward for Tagging. Any study about which the two screenings disagree, a third party adjudicator makes the final include/exclude decision.

Figure 21:
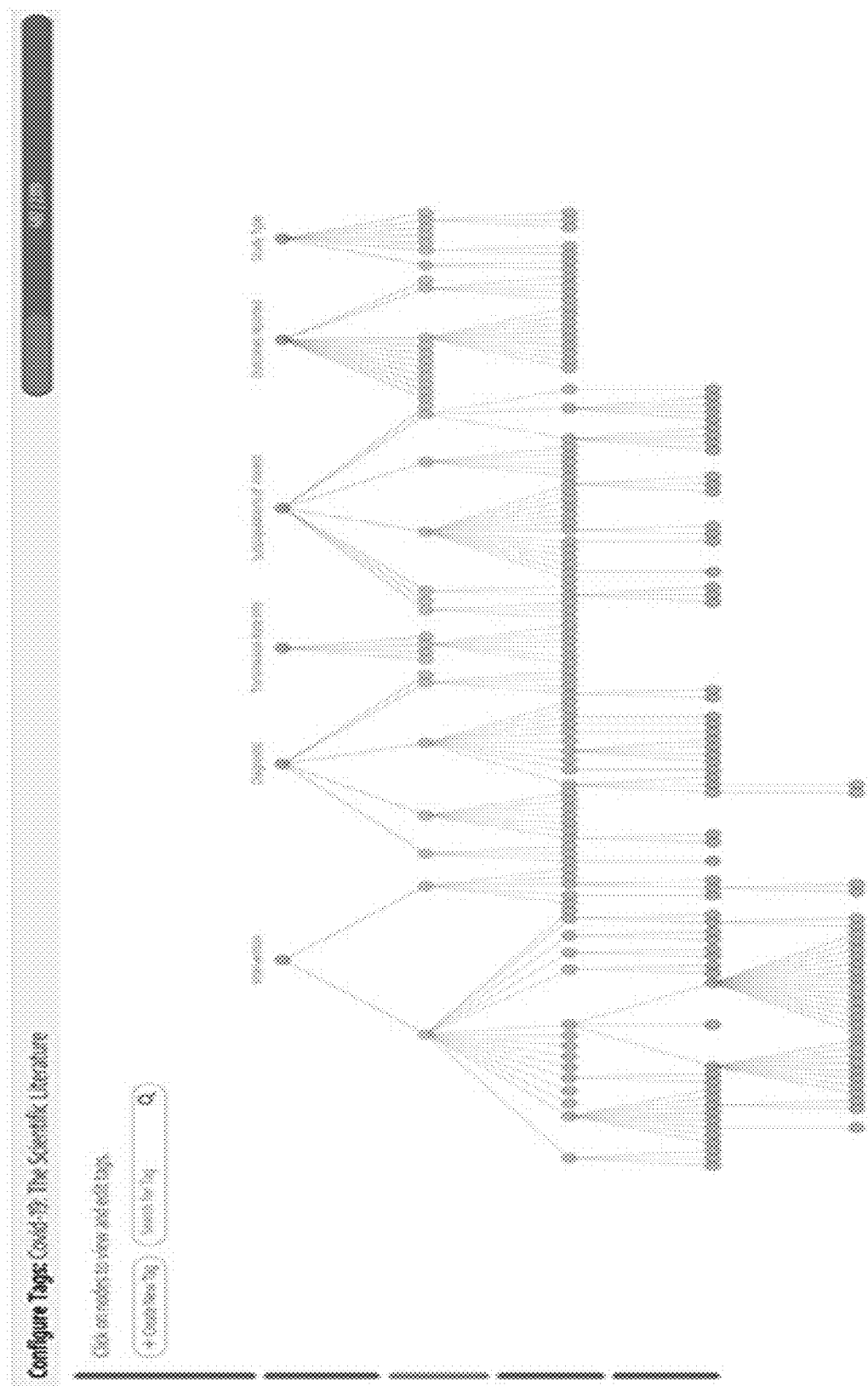
FIG. 21 is a twenty-sixth visual representation of a user experience consistent with certain embodiments of the present invention.

Turning now to FIG. 21, a twenty-sixth visual representation of a user experience consistent with certain embodiments of the present invention is shown. At 2102 is a screenshot of the Tag Hierarchy Configuration page, wherein a user creates tags by selecting "Create New Tag" and entering the tag name, parent tag, and aliases. These tags are then applied to studies in the Nest in the Sequential Tagging page. Tags may be merged, edited, or deleted (including "cascading delete", wherein a tag and all of its children and grandchildren are deleted at once) from this page. The user can "zoom in" on a specific tag by right-clicking it and selecting "zoom to", which will show only that tag and its children/grandchildren for closer examination.

Figure 22:
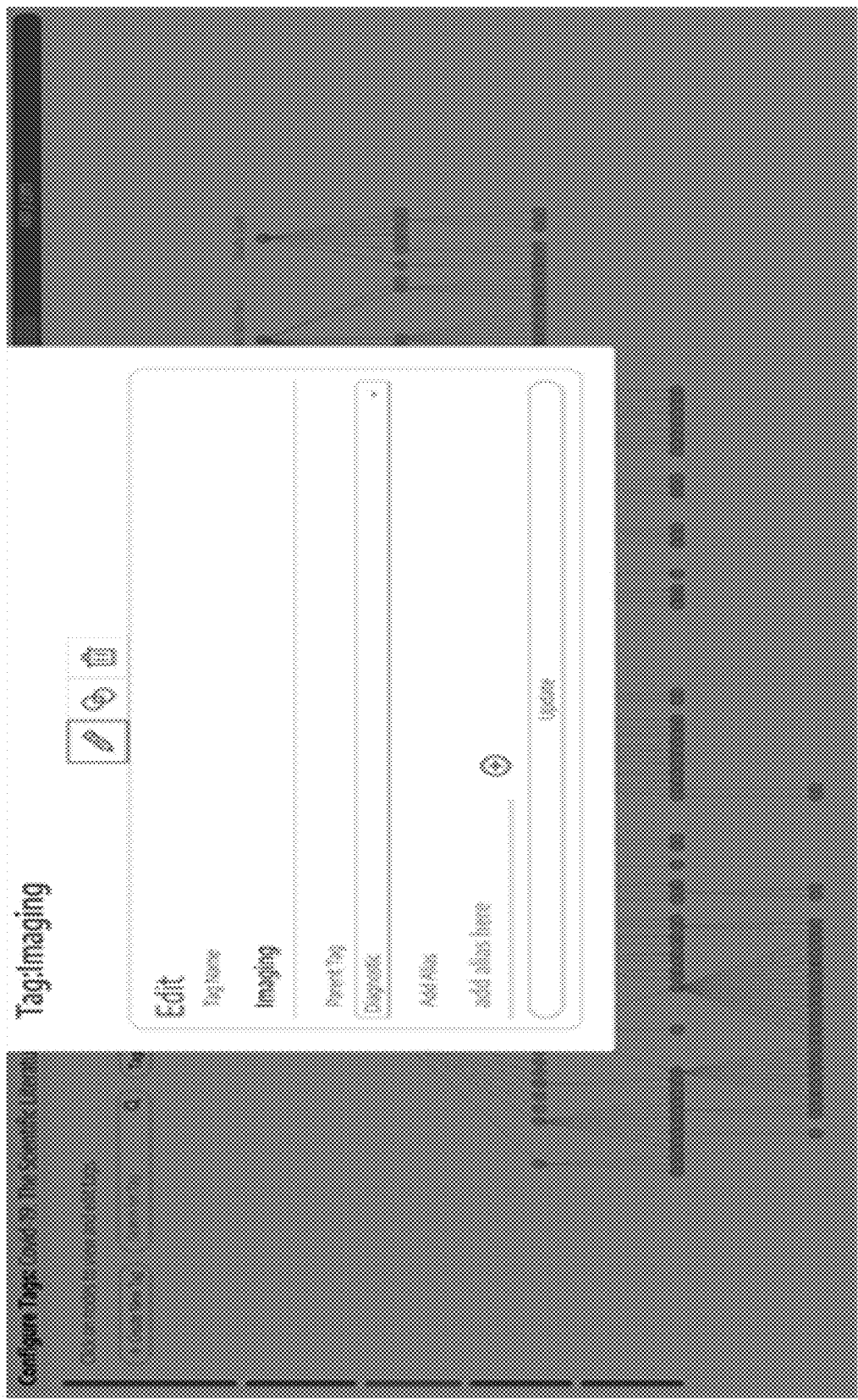
FIG. 22 is a twenty-seventh visual representation of a user experience consistent with certain embodiments of the present invention.

Turning now to FIG. 22, a twenty-seventh visual representation of a user experience consistent with certain embodiments of the present invention is shown. At 2202 is a screenshot of the Tag Hierarchy Configuration page with the "Create/Edit Tag" modal open. In this modal, users add or edit the tag name, identify the parent tag using the type-ahead drop-down menu, and identify any acronyms or synonyms as "aliases". The merge and delete tools are also found within this model.

Figure 23:
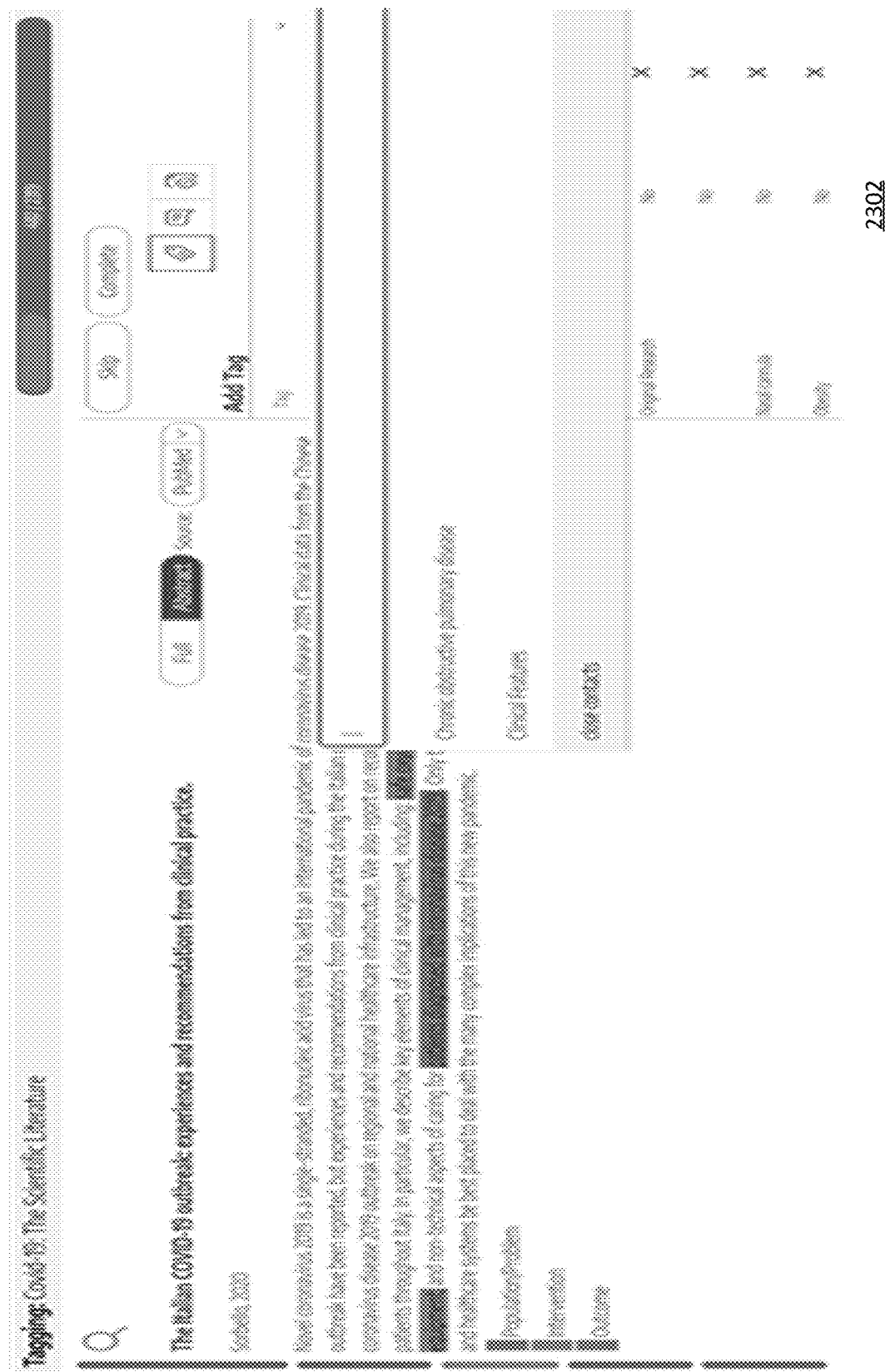
FIG. 23 is a twenty-eighth visual representation of a user experience consistent with certain embodiments of the present invention.

Turning now to FIG. 23, a twenty-eighth visual representation of a user experience consistent with certain embodiments of the present invention is shown. At 2302 is a screenshot of the Sequential Tagging page, wherein the user is presented with a study that has been included in a Nest. Here, the user can view the abstract or full text PDF of a study, and apply content tags that were configured in the Tagging Hierarchy Configuration page. For each tag, the user has the option to copy-paste a text string from the study that reflects the content tag.

Turning now to FIG. 24, a twenty-ninth visual representation of a user experience consistent with certain embodiments of the present invention is shown. At 2402 is a screenshot of Study Viz, the interactive visualization of all tags applied to studies within a Nest. The sunburst diagram reflects the tagging hierarchy with the top-level tags on the inner ring, and their child tags extending out radially from them. To filter the table of studies on the right by tag, the user can search for tags or left-click a segment of the sunburst diagram. If the user selects more than one segment, the table displays only studies that contain all selected tags. Within the table, users can left-click the study titles to see the abstract, all tags applied to the study, and the full search and screening history of the study within the Nest.

Figure 25:
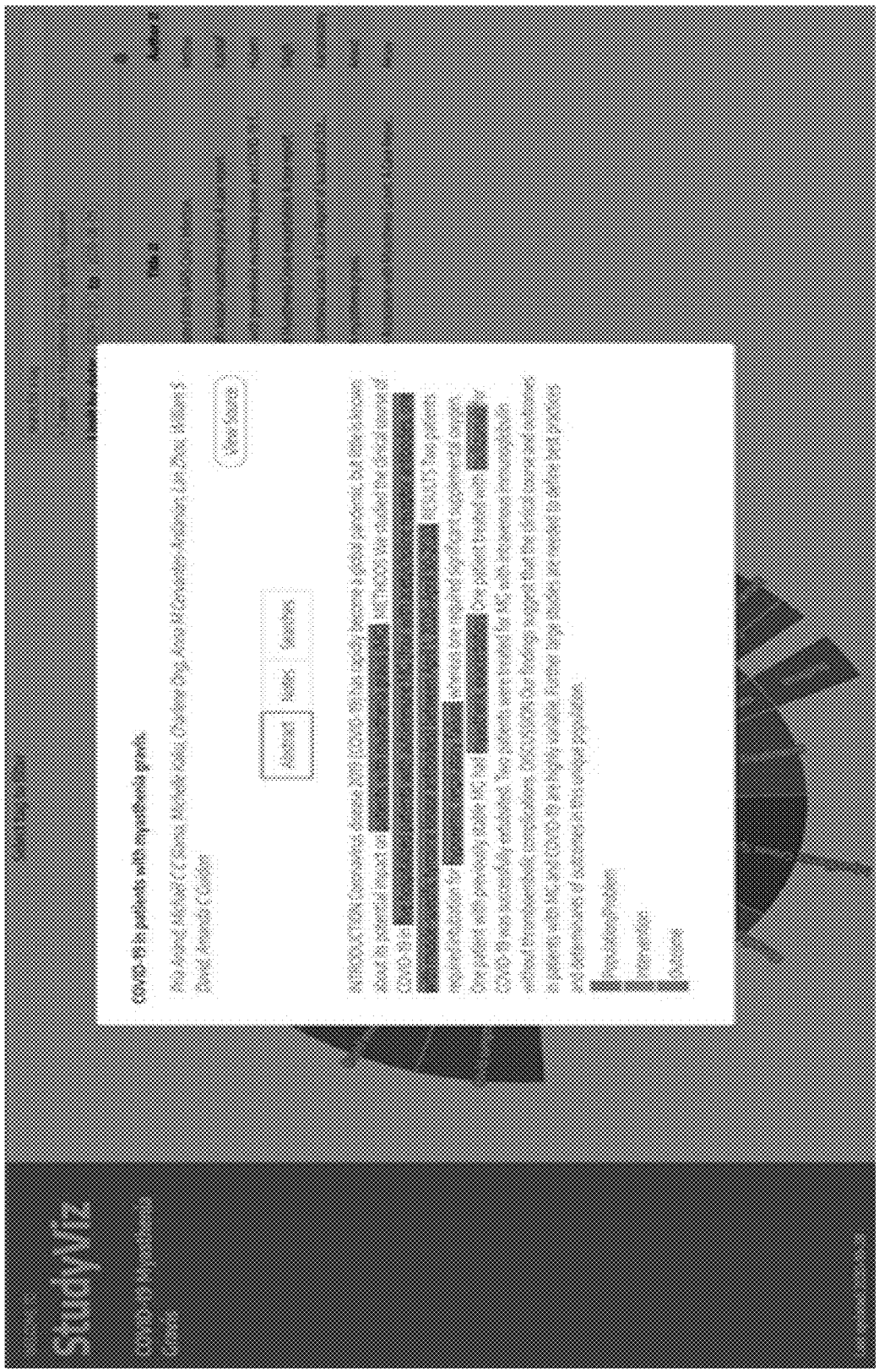
FIG. 25 is a thirtieth visual representation of a user experience consistent with certain embodiments of the present invention.

Turning now to FIG. 25, a thirtieth visual representation of a user experience consistent with certain embodiments of the present invention is shown. At 2502 is a screenshot of the Study Viz from FIG. 24, with two segments selected ("Gender" and "Myasthenia Gravis Specific Treatment"; once the table was reduced to only studies with these two tags, one was selected to display the abstract of the study, with the Patient Population, Interventions used, and Outcomes highlighted using machine learning, and tabs to show the tags ("Notes") and search/screening history ("Searches").

Figure 26:
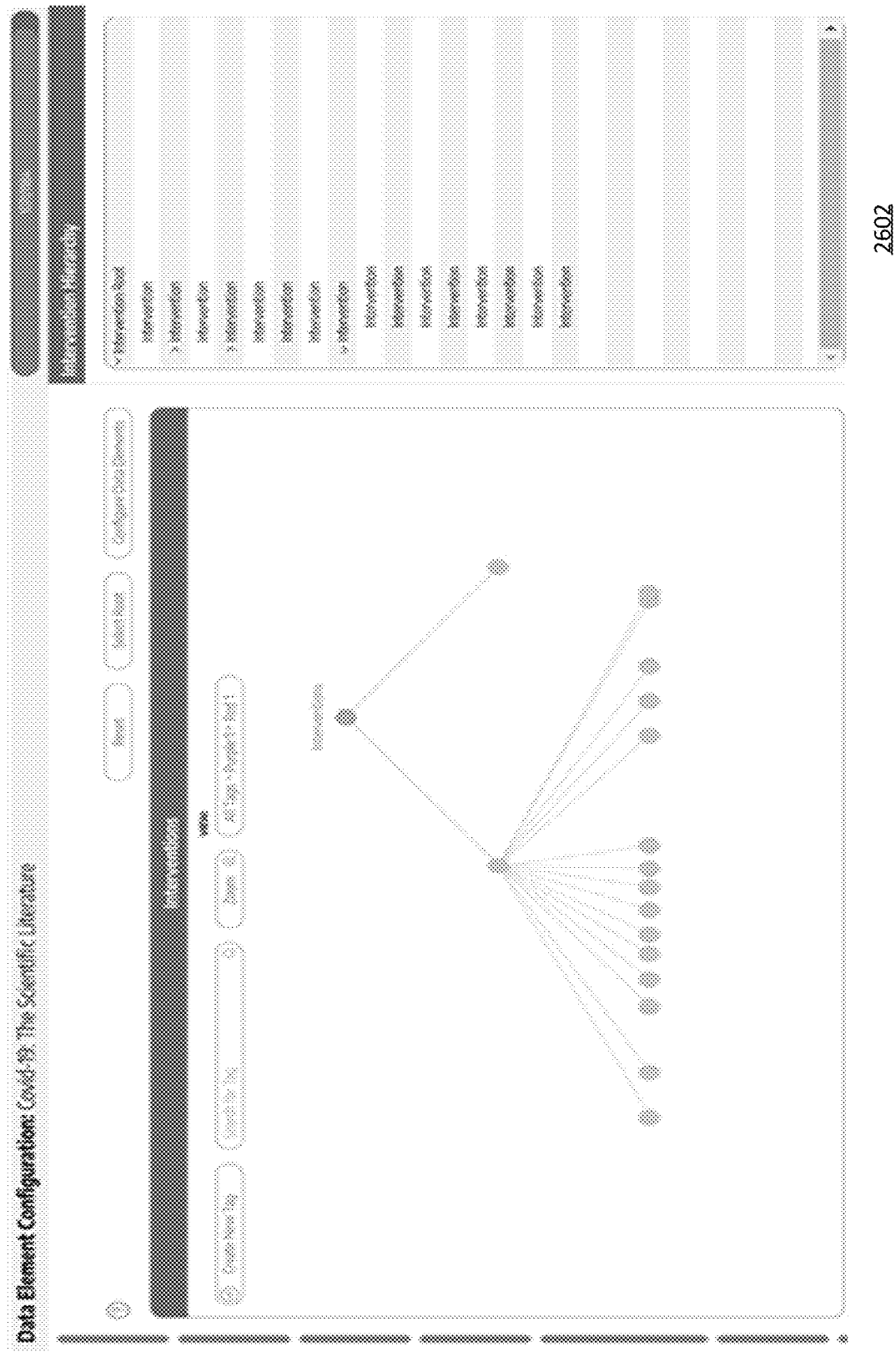
FIG. 26 is a thirty-first visual representation of a user experience consistent with certain embodiments of the present invention.

Turning now to FIG. 26, a thirty-first visual representation of a user experience consistent with certain embodiments of the present invention is shown. At 2602 is a screenshot of the tags that were configured in the Tagging Hierarchy Configuration page; within these tags, the user selects one tag that represents the parent tag of all Interventions. Once this is complete, the user can edit this tag and its children/grandchildren to ensure that they reflect the interventions used on patient groups within the studies in a Nest.

Figure 27:
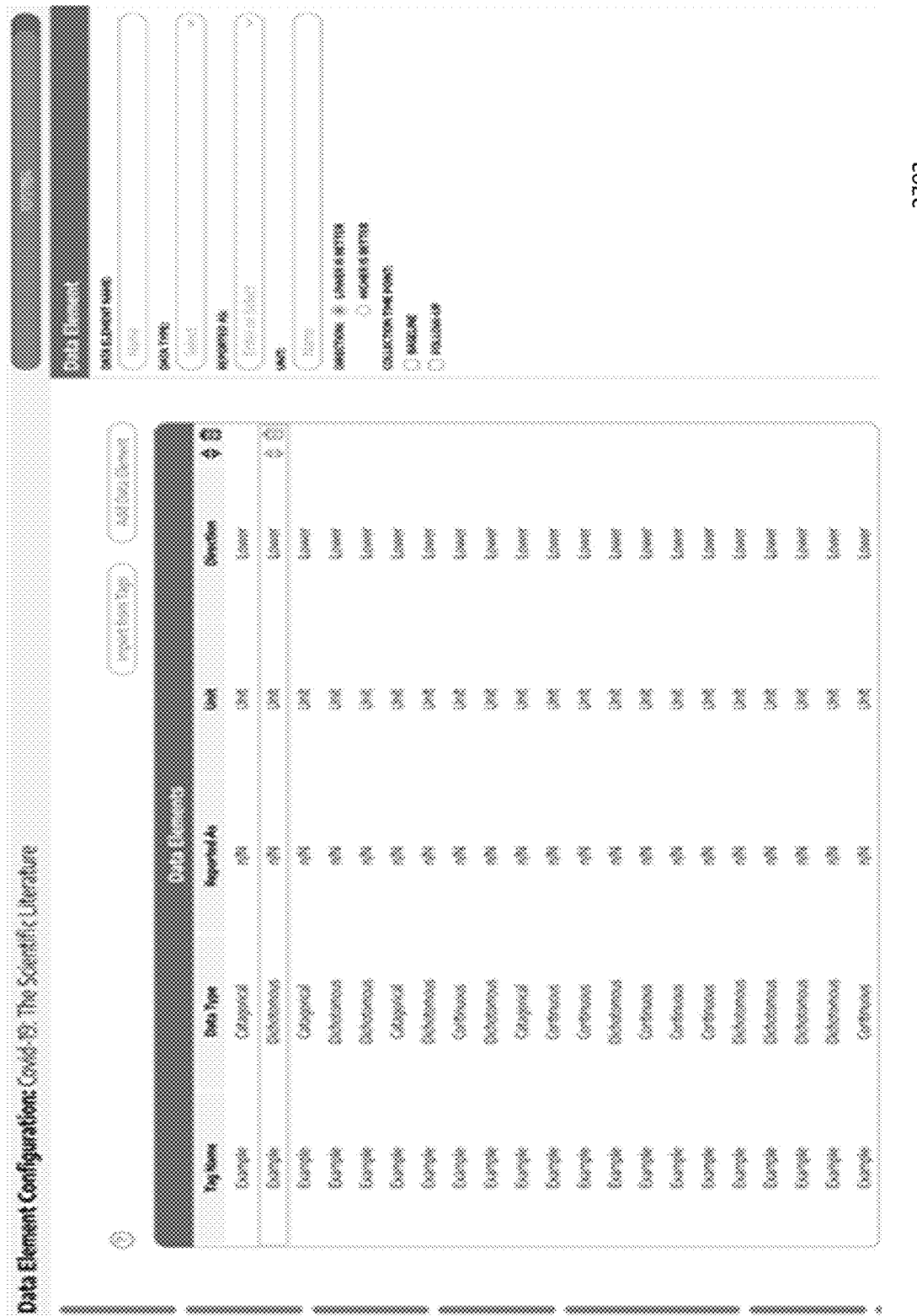
FIG. 27 is a thirty-second visual representation of a user experience consistent with certain embodiments of the present invention.

Turning now to FIG. 27, a thirty-second visual representation of a user experience consistent with certain embodiments of the present invention is shown. At 2702 is a screenshot of all tags that were not selected as Interventions in a list, and requires that the user enter information about the tags:
Continuous, Dichotomous, or Categorical in nature.
If Continuous, the user provides the following information on the Data Element:
"Reported At"/Timepoint. Options:
Baseline—at first patient presentation
Follow-up—at timepoint subsequent to first presentation
Both
"Reported As"/Statistic. Options:
Mean, SD (default)
Median, IQR
Unit
Direction
"Lower is better" (as in, a lower number is considered better for the patient)
"Higher is better" (default)
If Dichotomous, the user provides the following information about the Data Element:
"Reported At"/Timepoint. Options:
Baseline—at first patient presentation
Follow-up—at timepoint subsequent to first presentation
Both
"Reported As"/Statistic is only given one option: n/N
Direction
"Lower is better"
"Higher is better" (default)
If Categorical, the user provides the following information about the Data Element:
"Reported At"/Timepoint. Options:
Baseline—at first patient presentation
Follow-up—at timepoint subsequent to first presentation
Both.
"Reported As"/Statistic is only given one option: n/N
Categories:
User can configure any number of categories
User names each category (free-text)
Order of categories can be used to imply ordinal categories This configuration of a tag provides the context necessary to complete automated statistical analysis of any Data Element gathered into a Nest. By configuring hierarchical Interventions, the user establishes the patient groups that will be reflected in a Nest; by configuring contextualized Data Elements, the user identifies which variables to gather and prepares automated statistical analysis. Both configurations can be edited at any point, even after Extraction is complete.

While certain illustrative embodiments have been described, it is evident that many alternatives, modifications, permutations and variations will become apparent to those skilled in the art in light of the foregoing description.

We claim:

1. A method for measuring the quality of data reporting in a given medical study, comprising:
identifying and collecting data from published medical studies, of a plurality of published medical studies, associated with a pre-selected disease;

categorizing collected data disclosed in each study of said published medical studies based on data elements disclosed in each study of the published medical studies;

applying one or more user-specified data tag configurations to each study of the published medical studies;

applying a time decay factor to data for each study of said published medical studies based upon study date of publication where the time decay factor is increased in proportion to the years since study date of publication;

weighting tagged data based on a frequency of a given data element;

removing study metadata that is a duplication of previously collected data from the published medical studies;

applying a Q Factor algorithm to determine a central data tendency for each study of said published medical studies where a low time decay factor gives preference and greater weight to recent data elements resulting from updated study reporting as compared with older data elements from older reports;

computing a geometrical closeness of a given metric to a study from said published medical studies;

producing a visual representation of the geometrical closeness; and displaying the visual representation to a user.

2. The method of claim 1, further comprising collecting a set of selected studies from published medical studies for said pre-selected disease, where all selected studies are subjected to a text search and compared against a text search of articles that were not selected for inclusion in said set of selected studies.

3. The method of claim 2, further comprising identifying words most commonly found in each study, where the words most commonly found in said selected studies are compared with excluded studies to discover if the same words are most commonly found in said excluded studies as well.

4. The method of claim 3, further comprising predicting inclusion of studies in a category based on identifying metadata of abstracts of texts.

5. The method of claim 1, further comprising a selection of studies that are determined to be highly relevant, where the highly relevant studies are directly relevant to said pre-selected disease and comprise a low time decay factor and report all data elements that are commonly contained in studies of the same pre-selected disease.

6. The method of claim 1, further comprising choosing studies based on a prediction score associated with data related to a research question.

7. The method of claim 1, in which the visual representation pertains to a medical subfield or a disease state.

8. The method of claim 1, further comprising applying a time decay function to said collected data.

9. The method of claim 1, further comprising recording a methodology for an identification and collection of data elements.

10. The method of claim 1, wherein categorizing includes categorizing research using conceptual relatedness in connection with centroid clustering.

11. The method of claim 1, further comprising visually presenting overlap between candidate search terms.

12. The method of claim 11, further comprising representing overlap between candidate search terms using Venn Clustering.

13. The method of claim 11, further comprising tokenizing search terms into n-grams.

14. The method of claim 13, further comprising extracting n-gram groupings via an application programming interface (API).

15. The method of claim 14, wherein the metadata is selected from the group consisting of date of publication, title, author(s), institution affiliation, article keywords, article abstract, uniform resource locator (URL), and a combination thereof.

16. The method of claim 1, further comprising providing a rectangular plot of topics that appear most commonly across studies returned from searches using a linguistic clustering algorithm.

17. The method of claim 16, further comprising determining accuracy of the linguistic clustering algorithm in connection with a receiver operating characteristic calculation.

18. The method of claim 17, wherein the receiver operating characteristic calculation is generated in connection with using 80% of screened studies as a training dataset and 20% of data as a test dataset.

19. The method of claim 17, further comprising using least squares optimization of a set of second and third degree intersections between search terms to fit a two-dimensional Venn diagram representing overlap in candidate search term results.

20. The method of claim 1, further comprising entering disease state, treatments, and outcomes using an application programming interface (API).

* * * * *